United States Patent [19]
Matsuzaki et al.

[11] Patent Number: 5,619,292
[45] Date of Patent: Apr. 8, 1997

[54] CAMERA

[75] Inventors: Minoru Matsuzaki, Hachioji; Yuta Sato, Hino; Sumio Kawai, Hachioji; Hiroyuki Takizawa, Hachioji; Masaharu Hamada, Hachioji; Tomoki Funakubo, Hachioji, all of Japan

[73] Assignee: Olympus Optical Co., Ltd., Tokyo, Japan

[21] Appl. No.: 445,879

[22] Filed: May 22, 1995

[30] Foreign Application Priority Data

May 24, 1994 [JP] Japan ................................ 6-109835
May 25, 1994 [JP] Japan ................................ 6-111293

[51] Int. Cl.$^6$ ............................................. G03B 17/50
[52] U.S. Cl. ................................... 396/32; 396/40
[58] Field of Search .............................. 354/85, 86

[56] References Cited

U.S. PATENT DOCUMENTS

| | | | |
|---|---|---|---|
| 4,104,669 | 8/1978 | Friedman | 354/304 |
| 4,236,806 | 12/1980 | Hoadley | 354/303 |
| 4,460,255 | 7/1984 | Kozai et al. | 354/86 |
| 4,736,221 | 4/1988 | Shidara | 354/317 |
| 4,839,676 | 6/1989 | Lippert et al. | 354/86 |
| 4,905,036 | 2/1990 | Asano et al. | 355/27 |
| 5,164,752 | 11/1992 | Fiorentini | 354/84 |
| 5,467,158 | 11/1995 | Murashima et al. | 354/173.1 |
| 5,502,532 | 3/1996 | Biesinger et al. | 354/298 |

FOREIGN PATENT DOCUMENTS 1-298335  1/1989  Japan.
3-49535   5/1991  Japan.
5-297059  11/1993 Japan.

*Primary Examiner*—Safet Metjahic
*Assistant Examiner*—Christopher E. Mahoney
*Attorney, Agent, or Firm*—Louis Weinstein

[57] ABSTRACT

A camera using films each having a development processing solution in a solution accommodating bag includes rollers feeding photographed film outside of the camera or into an accommodating chamber, a piezoelectric press member held between an electrode and an elastic member also serving as an electrode presses photographed film and spreads development processing solution in the solution bag over an entire exposing portion. A piezoelectric member vibrated by AC voltages applied to the electrode and elastic member reduces a frictional force of the film caused by the press member. The processing solution is heated by vibrating the press member to generate heat. A camera using films each having a development processing solution accommodated in a solution bag includes a follower roller disposed on the upper side of the film, an ultrasonic motor composed of a vibrator on the lower side of the film, a temperature sensor detecting temperature of the ultrasonic motor, a peripheral temperature measuring circuit for detecting a peripheral temperature and a control circuit controlling drive of the ultrasonic motor based on the results detected by the temperature sensor and the peripheral temperature measuring circuit. The ultrasonic motor also serves as a film feed unit for feeding photographed film outside of the camera or into an accommodating chamber, a press unit for pressing photographed film and spreading development processing solution in the solution bag over an entire exposing portion and a heating unit for heating development processing solution before spreading.

30 Claims, 18 Drawing Sheets

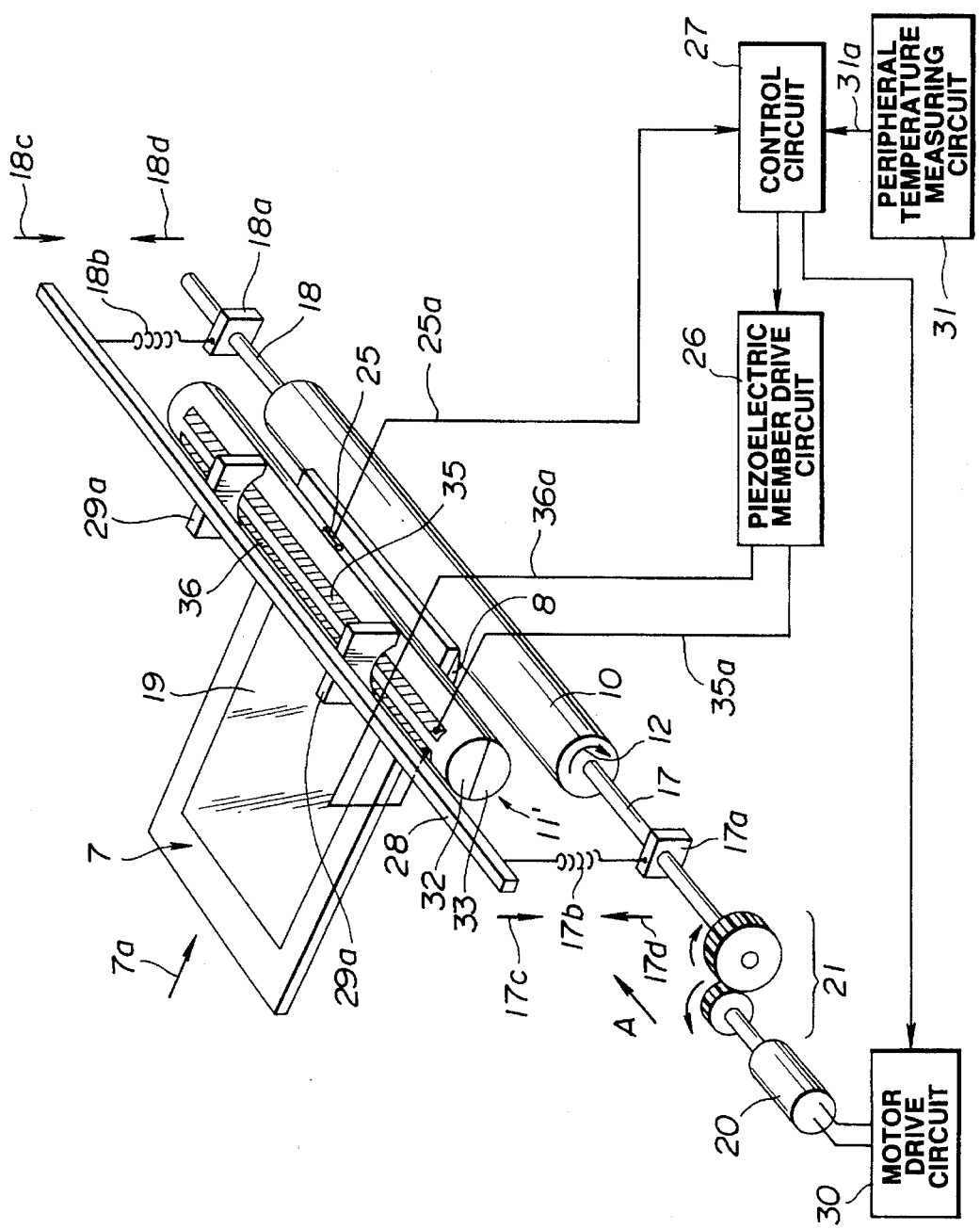

CAMERA

BACKGROUND OF THE INVENTION

1. Field of the Invention

The present invention relates to a camera, and more specifically, to a camera using films each including a development processing solution.

2. Related Art Statement

A camera using films each including a development processing solution has been conventionally well known as a so-called instant camera by which a photograph can be observed at once at the place it was taken.

The instant camera generally uses a sheet-shaped instant film, and a film called a mono-sheet type film included in the sheet-shaped instant film need not be separated to two sheets after being photographed and thus can be easily handled.

Various types of cameras using the mono-sheet type film have been conventionally proposed and, for example, Japanese Patent Publication Laid-Open No. 1-298335 discloses an example of these cameras.

The film and camera disclosed in the publication will be described with reference to FIG. 1.

The mono-sheet type film denoted by numeral 7 in FIG. 1 has an exposing portion 19 which is formed to a size a little smaller than the periphery of the film 7 and the surface of the exposing portion 19 is covered with transparent plastics where the image of a subject is exposed.

A processing solution accommodating bag 8 accommodating a development processing solution is disposed along an edge of the film 7. In the following description, the side of the film 7 where the processing solution accommodating bag 8 is provided is described as a front edge and the other side of the film 7 opposite to the front edge is described as a rear edge. Note, the portion between the processing solution accommodating bag 8 and the exposing portion 19 is initially sealed.

The camera is provided with an electromagnetic motor 90 as an actuator and the rotational force of the electromagnetic motor 90 is transmitted to an upper roller 92 disposed on the upper side of the film 7 to be fed and to a lower roller 93 disposed on the lower side of the film 7 through a gear train 91 including a reduction gear.

Note, since the electromagnetic motor 90 is a type of a motor which generates torque when it rotates at a high speed, the reduction gear is an indispensable element.

The upper roller 92 and the lower roller 93 are rotated in the directions of arrows 92a and 93a by the gear train 91, respectively to feed the film 7 in the direction of an arrow 7a.

A rotary shaft 92d for transmitting a rotational force from the gear train 91 is integrally connected to an end of the upper roller 92 and a rotary shaft 92e coaxial with the rotary shaft 92d is integrally connected to the other end of the upper roller 92. These rotary shafts 92d, 92e are rotatably supported by bearings 92b, 92c, respectively.

A rotary shaft 93d for transmitting the rotational force from the gear train 91 is integrally connected to an end of the lower roller 93 and a rotary shaft 93e coaxial with the rotary shaft 93d is integrally connected to the other end of the lower roller 93. These rotary shafts 93d and 93e are rotatably supported by bearings 93b, 93c, respectively.

A spring 94 is interposed between the bearing 92b and the bearing 93b and a spring 95 is interposed between the bearing 92c and the bearing 93c, respectively.

These springs 93, 94 are used to keep certain distances between the bearings 92b, 93b and between the bearings 92c, 93c when no external force is applied therebetween, whereas when external forces are applied in a direction to increase the distances therebetween, the bearings 93, 94 generate contraction forces in the direction opposite to the external forces. That is, the bearings 92b and 92c are attracted in the directions of arrows 96, 98 and the bearings 93b and 93c are attracted in the directions of arrows 97, 99.

With this arrangement, when the external force is not applied between the upper roller 92 and the lower roller 93, that is, when the film 7 is not yet held between the rollers 92 and 93, the interval between the rollers 92, 93 are kept to a certain value.

When the external force is applied between the upper roller 92 and the lower roller 93, that is, when the film 7 is held between the rollers 92 and 93, a press force is applied to the film 7 therebetween by the contraction forces of the springs 94, 95. FIG. 1 shows the state that the portion of the processing solution accommodating bag 8 along the front edge of the film 7 is held between the upper roller 92 and the lower roller 93 and the press force is applied thereto.

The film 7 having been exposed by the camera arranged as described above will be processed as described below.

After the image of a subject is exposed to the exposing portion 19 of the film 7, the processing solution accommodating bag 8 along the front edge of the photographed film 7 is fed while being pressed by the two rollers 92, 93, so that the seal of the processing solution accommodating bag 8 is broken. Then, the development processing solution accommodated in the processing solution accommodating bag 8 is spread on the side of the exposing portion 19.

At the time, since the surface of the developing portion 19 is covered with the transparent plastics as described above, even if the development processing solution is spread, it does not leak to the outside.

When the press force is continuously applied toward the rear edge of the film 7 by the rollers 92, 93, the development processing solution is spread over the entire surface of the exposing portion 19 and a development processing is carried out. At the time, the development processing solution must be uniformly spread over the entire surface of the developing portion 19 to carry out the development processing without irregularity.

At the same time, the film 7 is discharged to the outside of the camera by the rotation of the two rollers 92, 93. Otherwise, when a photographed film accommodating chamber is provided with the camera, the film 7 is fed into the chamber. Then, after a predetermined period of time elapses, the image of the subject is formed on the exposing portion 19 and thereafter the development is automatically stopped.

In the camera disclosed in Japanese Patent Publication Laid-Open No. 1-298335 as described above and the like, since the upper and lower rollers must be rotated while they apply a press force to a film, a large amount of energy is lost in the bearings of the rollers and thus a strong motor is required.

Since the electromagnetic motor is used as the actuator of a processing solution spread unit, the reduction gear is required and a problem arises in that the structure of the camera is made complex by the reduction gear, large operation sound is produced and electromagnetic noise may be generated.

In order to uniformly spread the development processing solution, a high dimensional accuracy is required to the rollers to finish the surfaces thereof uniform, by which a cost is increased.

Since the film must be fed straight in a predetermined direction to uniformly spread the development processing solution, guides are required on the both sides of the film.

Incidentally, since an instant film is developed at a place where it was photographed, the temperature of a development processing solution is approximately equal to the environmental temperature of the camera. As a result, when a photograph is taken at, for example, a cold place, there is a problem that the temperature of the development processing solution also becomes low and development slowly progresses.

To cope with the above problem, the applicant proposes a device disclosed in Japanese Patent Application No. 5-297059 as an example of conventional devices. This proposal is arranged such that a development processing solution contained in a film is heated through rollers pressed against the film when the film is fed.

More specifically, a heater is provided to heat the roller as well as a temperature sensor is disposed to a bearing of the roller and the temperature of the roller is controlled with reference to an output from the temperature sensor.

However, the device disclosed in Japanese Patent Application No. 5-297059 must provide the heater as dedicated roller heating means, by which the structure of the device is made complex.

Further, since the roller rotates, the temperature sensor cannot be directly fixed on the roller and is inevitably disposed to the bearing of the roller. Thus, it is difficult to correctly detect the temperature of the roller. In addition, the environmental temperature of the camera is not measured, a heat control cannot properly be carried out in accordance with the environmental temperature.

OBJECTS AND SUMMARY OF THE INVENTION

A first object of the present invention is to provide a less expensive camera having press means with a small energy loss.

A second object of the present invention is to provide a less expensive camera with a simple arrangement which does not require dedicated means for heating a development processing solution.

A third object of the present invention is to provide a less expensive camera with a simple arrangement which has small operation sound and does not generate electromagnetic noise.

A fourth object of the present invention is to provide a less expensive camera with a simple arrangement which does not require film feed means and press means separately.

A fifth object of the present invention is to provide a camera capable of effectively heating a development processing solution.

A sixth object of the present invention is to provide a camera capable of detecting the temperature of press means.

A seventh object of the present invention is to provide a camera capable of heating a development processing solution in accordance with a peripheral temperature.

An eighth object of the present invention is to provide a camera capable of effectively feeding a film.

A ninth object of the present invention is to provide a less expensive film pack having press means with a small energy loss.

A tenth object of the present invention is to provide a less expensive film pack with a simple arrangement which does not require dedicated means for heating a development processing solution.

An eleventh object of the present invention is to provide a less expensive film pack with a simple arrangement which has a small operation sound and does not generate electromagnetic noise.

A twelfth object of the present invention is to provide a less expensive film pack with a simple arrangement which does not require film feed means and press means separately.

In brief, the camera of the present invention is a camera using films each including a development processing solution and includes film feed means for feeding the exposed film to the outside of the camera or into an accommodating chamber, press means for pressing the exposed film and spreading the development processing solution over the entire image region of the film and an electro-mechanical energy conversion element provided with the press means and reducing the friction force on the pressed surface of the film by vibrating the press means.

These as well as other objects and advantages of the present invention will become further apparent from the following detailed explanation.

BRIEF DESCRIPTION OF THE DRAWINGS

FIG. 8 is a perspective view showing a processing solution spread unit of a second embodiment of the present invention;

DETAILED DESCRIPTION OF THE PREFERRED EMBODIMENTS

Embodiments of the present invention will be described below with reference to the drawings.

Figure 1:
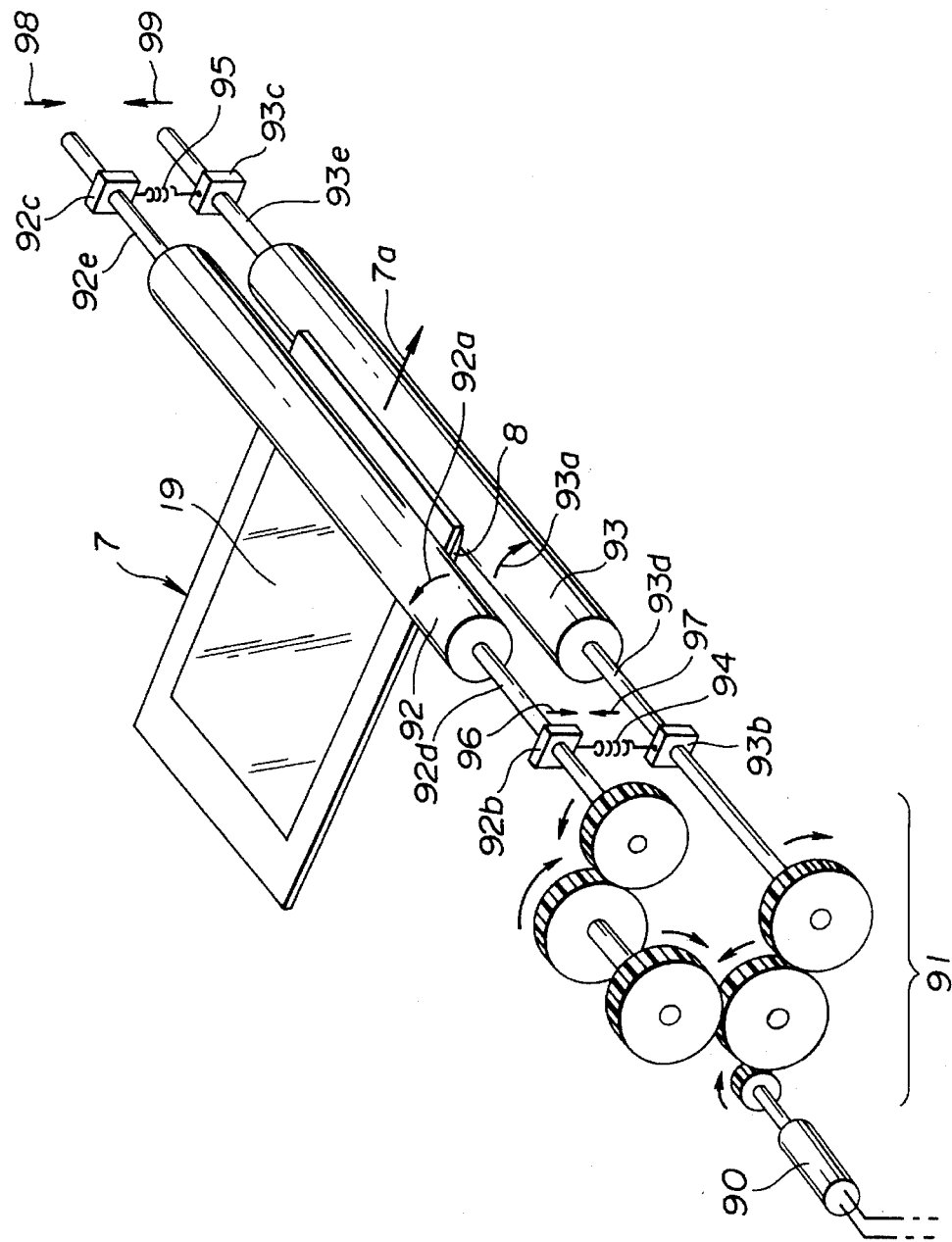
FIG. 1 is a perspective view showing a conventional processing solution spread unit.
Figure 2:
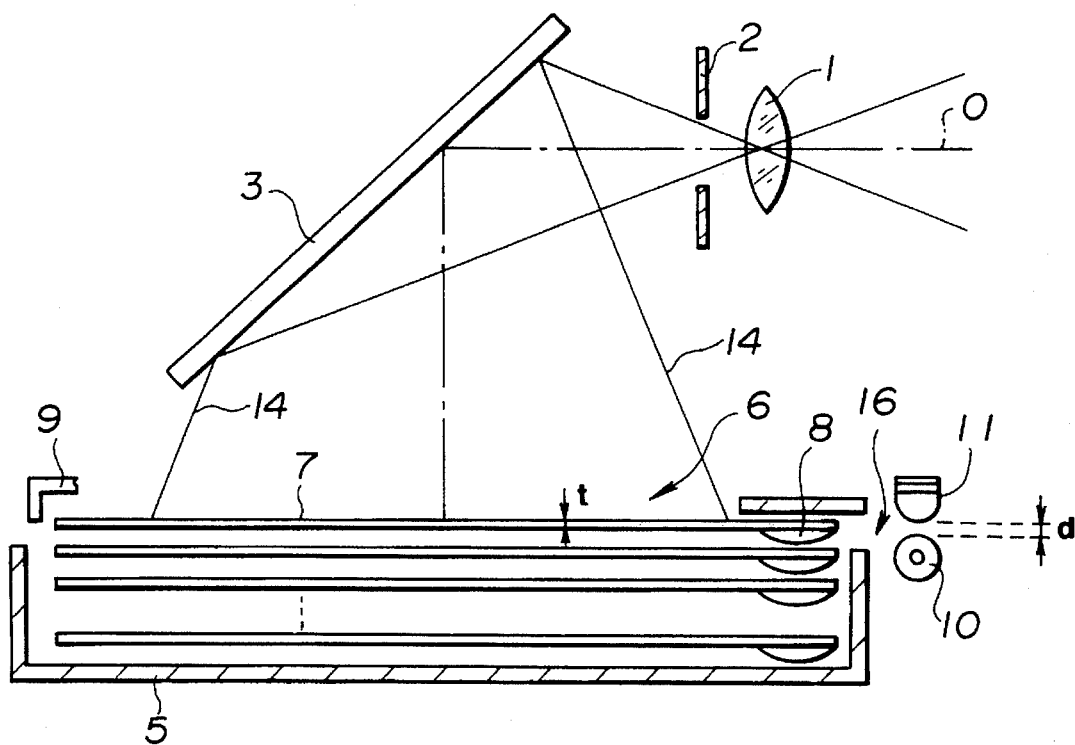
FIG. 2 is a side elevational view, partly in cross section, of an instant camera containing a processing solution spread unit when the image of a subject is exposed to a film in a first embodiment of the present invention.

FIG. 2 to FIG. 7 show a first embodiment of the present invention, wherein FIG. 2 is a side elevational view showing an instant camera containing a processing solution spread unit when the image of a subject is exposed to a film.

The instant camera is arranged such that the light beam of a subject incident from a photographing lens 1 passes through an opened shutter 2 and is reflected on a mirror 3 disposed with the reflecting surface thereof inclined downward at about 45°.

The mirror 3 is used to bend the optical axis 0 of a photographing optical system shown by a dot-dash line at 90° and reverse the image of the subject.

The range denoted by numeral 14 of the light beam of the subject reflected on the mirror 3 is focused on a film 7 horizontally disposed below the mirror 3.

The film 7 is a sheet-shaped instant film and a processing solution accommodating bag 8 accommodating a development processing solution is disposed along an edge of the film 7 and, for example, 10 sheets of the films are accommodated in a film pack 5 in a stacked state.

An opening 6 is defined on the upper surface of the film pack 5 and the image of the subject is exposed to an exposing portion 19 (refer to FIG. 4) formed on the upper surface of the uppermost film 7 of the films disposed by being stacked as described above through the opening 6.

The film pack 5 is provided with a discharge port 16 for discharging the photographed film 7 therethrough by the operation effected by a raking-out member 9 disposed to the other edge of the film pack 5.

A feed roller 10 and a press member 11 are disposed above and below the discharge port 16, respectively in the vicinity thereof, the film 7 is fed between them and a gap d between the feed roller 10 and the press member 11 is set slightly smaller than the thickness t of the film 7.

The press member 11 includes a piezoelectric member 22 as an electro-mechanical energy conversion element (refer to FIGS. 4 and 5) as described below and the press member 11 presses the film 7 while being vibrated by the piezoelectric member 22.

Further, the press member 11 also serves as means for heating the development processing solution of the film 7 by the heat generated by the piezoelectric member 22 when the peripheral temperature of the camera is low.

Figure 3:
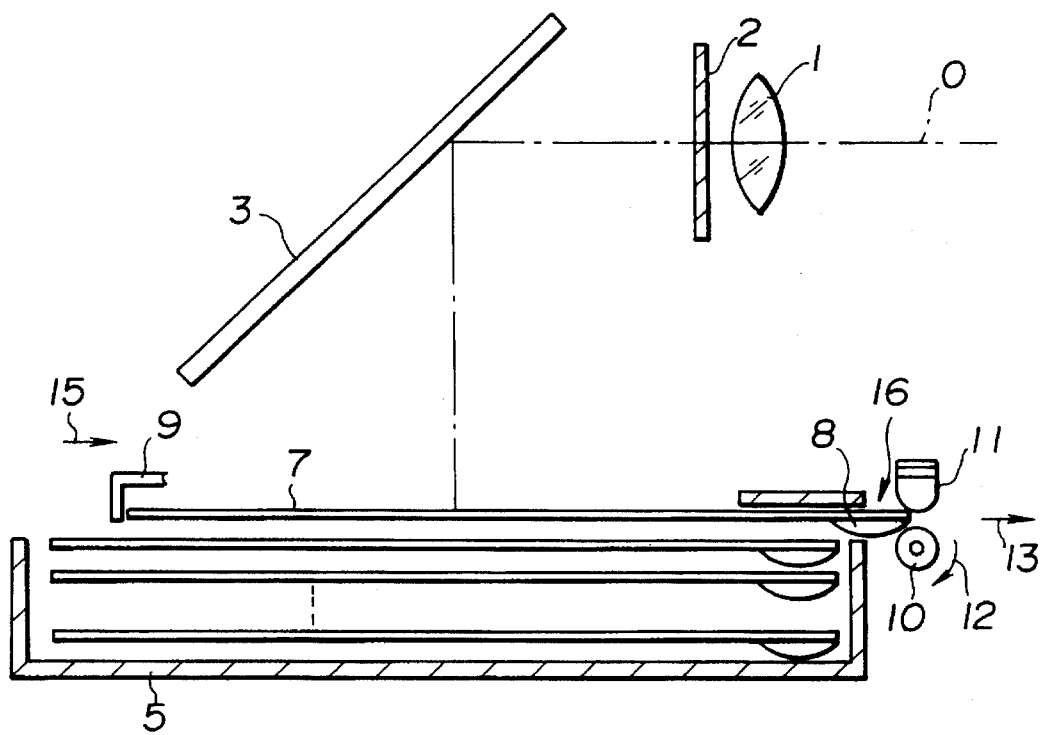
FIG. 3 is a side elevational view, partly in cross section, of the instant camera in the state that a photographed film having been exposed is raked out from a film pack in the first embodiment.

FIG. 3 is a view showing the state that the shutter 2 is closed to finish exposure and the photographed film 7 is being raked out from the film pack 5.

The raking-out member 9 moves in the direction of an arrow 15 and pushes out the uppermost photographed film 7 of the films stacked in the film pack 5 in the direction of the discharge port 16.

With this operation, the edge of the film 7 opposite to the edge thereof being pushed, i.e., the edge of the film 7 along which the processing solution accommodating bag 8 is provided projects from the discharge port 16 of the film pack 5.

In the following description, the edge of the film 7 to be pushed by the raking-out member 9 is called a rear edge and the edge of the film 7 along which the processing solution accommodating bag 8 is provided is called a front edge.

Then, the front edge of the film 7 is forced between the feed roller 10 and the press member 11. When the feed roller 10 is rotated in the direction of arrow 12, the film 7 is fed in the direction of arrow 13 by the propelling force of the feed roller 10.

Figure 4:
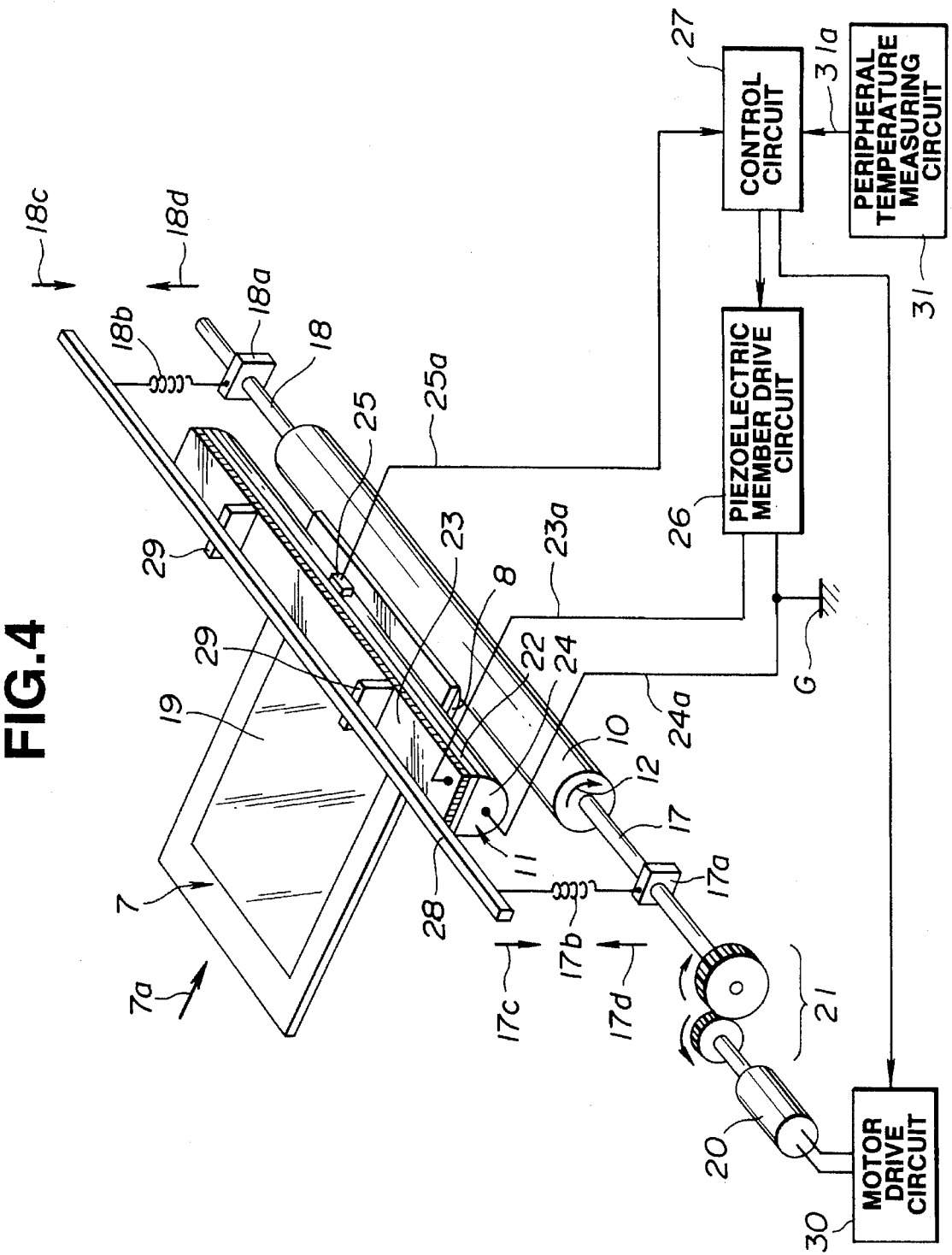
FIG. 4 is an enlarged perspective view showing the processing solution spread unit of the camera of the first embodiment.

FIG. 4 is an enlarged perspective view showing a processing solution spread unit of the camera.

As shown in FIG. 4, the rectangular film 7 has an exposing portion 19 having a size a little smaller than the periphery of the film 7. At an initial state, the exposition portion 19 is sealed from the processing solution accommodating bag 8 without communicating with it.

The feed roller 10 located on the lower side of the film 7 to be fed has shafts 17, 18 projecting from the both ends of the roller 10 integrally therewith. These shafts 17, 18 are rotatably supported by bearings 17a, 18a, respectively.

The shaft 17 is connected to a film feed motor 20 through a reduction gear 21, and the feed roller 10 is rotated in the direction of the arrow 12 by the drive force of the film feed motor 20 to feed the film 7 in the direction of arrow 7a.

The press member 11 located on the upper side of the film 7 to be fed is composed of the piezoelectric member 22 as the slender, rectangular electro-mechanical energy conversion element held between an upper electrode 23, which is also slender and rectangular and imposes a drive voltage to the piezoelectric member 22, and a lower metal elastic member 24 having a cross section formed to a semi-circular shape and serving as the other electrode for imposing a drive voltage to the piezoelectric member 22. The press member 11 forms a vibrator as a whole.

Figure 5:
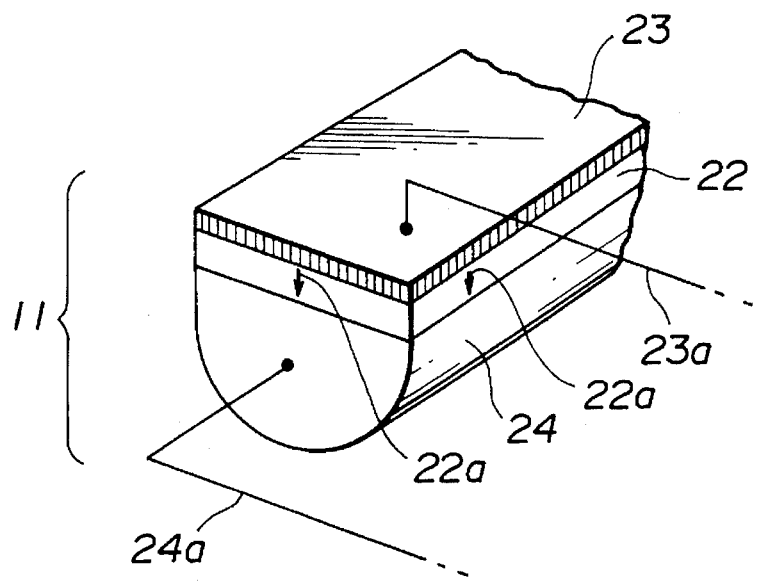
FIG. 5 is a partially enlarged perspective view showing the arrangement of a press member of the first embodiment.

As shown in FIG. 5, lead wire 23a and a lead wire 24a are electrically connected to the electrode 23 and the elastic member 24, respectively and drawn therefrom. Further, as shown in FIG. 5, the piezoelectric member 22 is polarized in the direction of an arrow 22a.

The lead wires 23a, 24a are connected to the output terminals of a piezoelectric member drive circuit 26 and one of the lead wires 24a is also connected to the ground potential G of an electric circuit contained in the camera. i.e., to the negative terminal of a battery (not shown).

With this arrangement, since the metal elastic member 24 in contact with the surface of the film 7 being fed is connected to the ground potential G, electrostatic charge generated on the surface of the film while the film is fed can be grounded to the ground potential G. Thus, even if electrostatic charge is generated to the film 7, it does not affect the development and the like of the film 7.

A temperature sensor 25 is adhered on the surface of the elastic member 24 to measure the surface temperature of the elastic member 24. An output of the temperature sensor 25 is input to a control circuit 27 through a lead wire 25a.

Since the press member 11 also serving as the heating means of this embodiment does not make a rotational motion even when the film 7 is fed, the sensor 25 can be directly fixed on the surface of the press member 11 and the lead wire can be drawn therefrom.

With this arrangement, the surface temperature of the press member 11 also serving as the heating means of the development processing solution of the film 7 can be more accurately measured as compared with conventional means. As a result, a heating operation can be more accurately controlled.

Further, the camera is provided with a peripheral temperature measuring circuit 31 for measuring a peripheral temperature, i.e. an atmospheric temperature and an output 31a from the circuit 31 is also input to the control circuit 27.

The control circuit 27 controls the piezoelectric member drive circuit 26 and also a motor drive circuit 30 for driving the film feed motor 20.

The press member 11 is supported in such a manner that a plurality of support members 29 are attached to the positions of the nodes of vibration to be generated and further a support bar 28 is attached to the plurality of these support members 29.

As described above, since the press member 11 of the processing solution spread unit of this embodiment has no rotating portion, no bearing is needed. Therefore, an energy loss in a bearing is eliminated and thus the energy efficiency of the processing solution spread unit is more improved than that of a conventional processing solution spread unit. Further, since the press means 11 can be fixed without using any bearing, there is also an advantage that the unit can be simply arranged.

A spring 17b is interposed between the bearing 17a and the support bar 28 and a spring 18b is interposed between the bearing 18a and the support bar 28, respectively and these springs 17b, 18b are used to keep a certain attracting therebetween when no external force is applied between the bearings 17a, 18a and the support bar 28.

When an external force is applied to increase the interval between the feed roller 10 and the support bar 28, a contraction force is generated in the direction opposite to the direction of the external force by the springs 17b, 18b.

More specifically, the spring 17b attracts the bearing 17a in the direction of an arrow 17d as well as attracting the support bar 28 in the direction of an arrow 17c, whereas the spring 18b attracts the bearing 18a in the direction of an arrow 18d as well as attracting the support bar 28 in the direction of an arrow 18c.

As a result of the above action, when no external force is applied between the feed roller 10 and the press member 11, that is, when the film 7 is not yet held between the feed roller 10 and the press member 11, the interval therebetween is kept to a given interval d shown in FIG. 2.

When an external force is applied between the feed roller 10 and the press member 11, that is, when the film 7 is held therebetween, a press force is applied to the film 7 between the feed roller 10 and the press member 11 by the contraction forces of the springs 17b, 18b.

FIG. 4 shows the state in which the portion of the processing solution accommodating bag 8 along the front edge of the film 7 is held between the feed roller 10 and the press member 11 and a press force is applied thereto.

A principle for vibrating the press member 11 will be explained with reference to FIG. 4 and FIG. 5.

As described above, the piezoelectric member 22 is polarized in the direction of the arrow 22a in FIG. 5. When a voltage is applied to the piezoelectric member 22 in the direction by which the lead wire 23a side, i.e., the electrode 23a side is made positive and the lead wire 24a side, i.e., the elastic member 24 side is made negative, the piezoelectric member 22 extends in the thickness direction thereof.

Since the volume of the piezoelectric member 22 is not changed at the time, the longitudinal direction of the piezoelectric member 22, i.e., the direction of the piezoelectric member 22 in the direction perpendicular to the direction of the arrow 7a in which the film 7 is fed is contracted by the amount of extension in the thickness direction.

As a result, since the elastic member 24 on which the piezoelectric member 22 is adhered is contracted on the upper end surface thereof, the press member 11 is bent as a whole so that the ends thereof are moved upward in FIG. 4.

On the other hand, when the direction of the voltage imposed on the piezoelectric member 22 is reversed, the piezoelectric member 22 is contracted in the thickness direction thereof and extended in the longitudinal direction thereof. As a result, the press member 11 is bent with the ends thereof moved downward in FIG. 4 contrary to the above.

When an AC voltage is imposed between the lead wire 23a and the lead wire 24a, the aforesaid extension and contraction of the piezoelectric member 22 are repeated so that bending vibration of the press member 11 is generated. When the frequency of the AC voltage to be imposed is set equal to a resonant frequency inherent to the press member 11, the press member 11 is resonated and the amplitude thereof is increased.

Since the area and time in and during which the press member 11 is in contact with the film 7 are reduced by finely vibrating the press member 11 by the above principle, the friction produced between the press member 11 and the film 7 can be greatly reduced, and thus operation for rotating the press member 11 becomes unnecessary when the film 7 is fed.

Even if the dimensional accuracy of the surface of the press member 11 not particularly high and the surface is somewhat irregular, the development processing solution can be uniformly spread by finely vibrating the press member 11 as described above.

Further, when the peripheral temperature of the camera is low, the development processing solution can be heated by the heat generated by the aforesaid vibration as described in more detail below.

Figure 6:
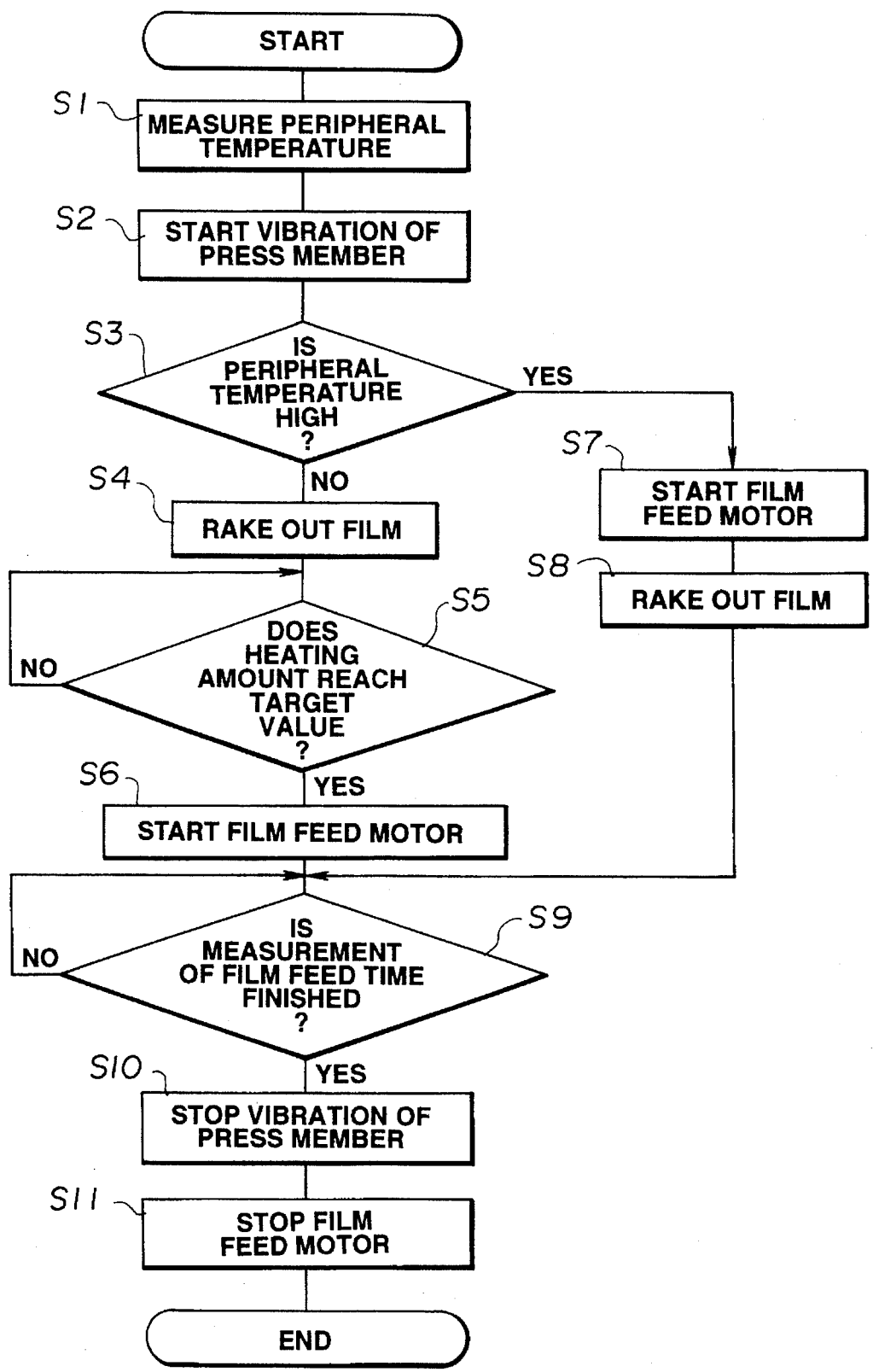
FIG. 6 is a flowchart showing the film feeding operation and processing solution spreading operation of the camera of the first embodiment.

FIG. 6 is a flowchart showing the operation of feeding the film and spreading the processing solution.

When a frame of image is photographed by the camera by closing the above shutter 2, the sequence of the flowchart starts.

First, the peripheral temperature of the camera is measured by the peripheral temperature measuring circuit 31 (step S1) and the result of the measurement is stored in the memory means of the control circuit 27.

Next, the vibration of the press member 11 is started by imposing a drive voltage on the piezoelectric member 22 of the press member 11 (step S2). With these steps, the friction on the surface of the press member 11 is greatly reduced this as the temperature of the surface thereof starts to increase.

Next, it is determined whether or not the peripheral temperature measured at step S1 is a predetermined temperature suitable for the development of the film 7, that is, whether the peripheral temperature is, for example, at least 25° C. or not (step S3).

When the peripheral temperature is below 25° C. at step S3, the photographed film 7 is raked out from the film pack 5 by the raking-out member 9 and the front edge of the film 7 is forced between the press member 11 and the feed roller 10 (step S4).

Since the feed roller 10 is not yet rotated at the time, the film 7 stops in the state that the front edge of the film 7 is inserted between the feed roller 10 and the press member 11, i.e., in the state that the upper surface of the processing solution accommodating bag 8 along the front edge of the film 7 is in contact with the press member 11. However, the seal of the processing solution accommodating bag 8 is not yet broken at this time.

Next, the development processing solution is heated while an amount of heat applied to the development processing solution is measured. That is, the surface temperature of the press member 11 is continuously measured by the temperature sensor 25 disposed on the press member 11 while a period of time of heating is measured which is a period of time elapsed since the press member 11 also serving as the heating means came into contact with the upper surface of the processing solution accommodating bag 8.

Although the development processing solution is heated through the upper surface of the processing solution accommodating bag 8, the material forming the processing solution accommodating bag 8 does not have a high heat transfer coefficient. Therefore, the surface temperature of the press member 11 as the heating means is not made equal to the temperature of the development processing solution.

Figure 7:
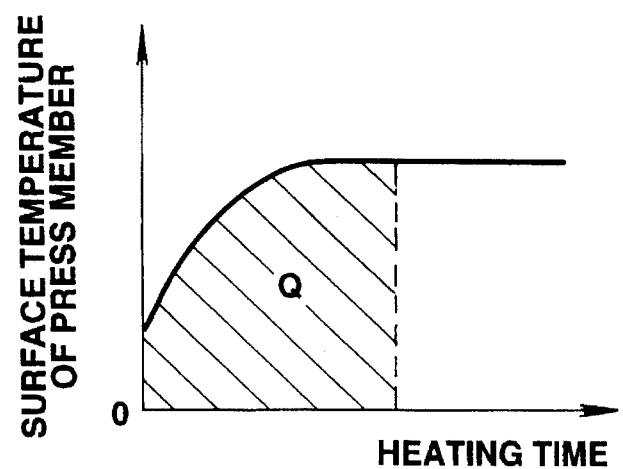
FIG. 7 is a graph showing the relationship between a heating time and the surface temperature of the press member in the first embodiment.

On the other hand, it is impossible to directly measure the temperature of the development processing solution. Thus, the relationship between the integrated value Q of the surface temperature of the press member 11 resulting from a heating time and the temperature of the development processing solution as shown in FIG. 7 is previously measured at the stage when a prototype of the camera is made or the like.

The integrated value Q is calculated by repeatedly detecting the surface temperature and the heating time of the press member 11 and the temperature of the development processing solution is calculated based on the integrated value Q.

Then, it is determined whether the temperature of the development processing solution reaches a target value determined in accordance with the peripheral temperature measured at step S1 or not (step S5).

The target value is determined taking the peripheral temperature and an amount of heat discharged in development which is determined by a period of time of development from the start of development to the end thereof. That is, an average temperature during the period of time of development is set to a proper development temperature by heating the development processing solution to a temperature somewhat higher than a proper development temperature.

When the temperature of the development processing solution reaches the target temperature at step S5, the film feed motor 20 is started (step S6) and the feed roller 10 is rotated and thus the heating of the development processing solution effected in the state that the film 7 stops is finished. When the film 7 starts to be fed, a press force is continuously applied from the front edge of the film 7 toward the exposing portion 19 and at the same time the seal of the processing solution accommodating bag 8 is broken and the development processing solution accommodated therein is spread over the exposing portion 19.

Since the surface of the exposing portion 19 is covered with the transparent plastics at the time, even if the development processing solution is spread, it does not leak to the outside.

The press member 11 is continuously vibrated to reduce the friction generated between the surface of the press member 11 and the film 7 even while the film 7 is being fed thereafter. Consequently, although the surface of the press member 11 is in the heated state, since the film 7 moves and a time at which a point on the film 7 is in contact with the press member 11 is very short, the temperature of the development processing solution is not almost increased while the film 7 is fed.

When a uniform press force is further applied continuously toward the rear edge of the film 7 as described above, the development processing solution is uniformly spread over the entire surface of the developing surface 19 so that a development processing is uniformly carried out.

On the other hand, when the peripheral temperature is 25° or higher at step S3, since the development processing solution need not be heated, the film feed motor 20 is started (step S7) to start the rotation of the feed roller 10.

Next, the raking-out member 9 rakes out the photographed film 7 from the film pack 5 (step S8) and the front edge of the film 7 is forced between the press member 11 and the feed roller 10.

After the front edge of the film 7 is held between the press member 11 and the feed roller 10, the film 7 is fed by the feed roller 10 having been rotated and at the same time the seal of the processing solution accommodating bag 8 is broken to spread the development processing solution over the developing portion 19.

After the execution of step S6 or step S8, a period of time during which the film 7 is fed is measured until the period of time reaches a predetermined target period of time (step S9). The target period of time is preset by measuring the period of time from the time at which the front edge of the film 7 starts to be held between the press member 11 and the feed roller 10 to the time at which the rear edge of the film 7 is completely left from between them.

At the time when the measurement of the period of time during which the film 7 is fed is finished, the photographed film 7 is discharged to the outside of the camera with the rear edge thereof completely left from between the press member 11 and the feed roller 10. At the time, the discharged film 7 is prevented from being dropped by the friction between a film discharge port provided with the not shown covering member of the camera and the rear edge of the discharged film 7.

Otherwise, although not shown, when a photographed film accommodating chamber is provided with the camera, the film 7 is fed into the chamber.

The film 7 is developed by the development processing solution and the image of a subject is formed on the exposing portion 19 after a certain period of time. Thereafter, the developing operation is automatically finished and the image of the subject is fixed on the exposing portion 19.

Upon completion of the above operation, the drive voltage imposed on the piezoelectric member 22 is turned off and the vibration of the press member 11 is stopped (step S10).

Further, the film feed motor 20 is stopped substantially at the same time with step S10 (step S11) to stop the feed roller 10 and the film feed and processing solution spread processing is finished.

Note, although the press member 11 is disposed on the upper side and the feed roller 10 is disposed on the lower side in the above description, it is needless to say that the press member 11 may be disposed on the lower side and the feed roller 10 may be disposed on the upper side by reversing the above positional relationship.

According to the first embodiment, since a pair of bearings are not needed, the arrangement of the camera can be simplified as reducing well as a loss of energy because a load when a film is fed is reduced.

Since the press member is finely vibrated, even if the surface of the press member does not have a particularly high accuracy, the development processing solution can be uniformly diffused.

Since the film press member which is vibrated by the piezoelectric member as the eleCtro-mechanical energy conversion element generates heat, when the development processing solution is heated making use of the heat, dedicated heating means becomes unnecessary and thus a simple arrangement can be achieved.

Since the press member also serving as the heating means does not rotate even while the film is being fed, the temperature sensor can be directly adhered on the surface of the press member. Therefore, the heating operation can be more accurately controlled because the surface temperature of the heating means can be directly and accurately measured.

The provision of the peripheral temperature measuring circuit enables a heating control to be more properly carried out in accordance with the peripheral temperature of the camera.

Figure 9:
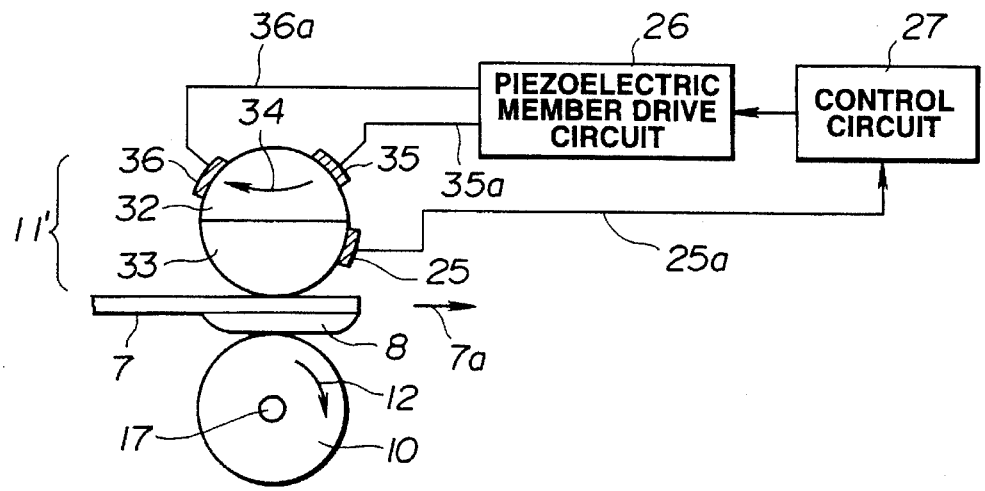
FIG. 9 is a side elevational view of a press member of the second embodiment observed from the direction of an arrow A of FIG. 8.

FIG. 8 and FIG. 9 show a second embodiment of the present invention, wherein FIG. 8 is a perspective view showing a processing solution spread unit and FIG. 9 is a side elevational view a press member observed from the direction of an arrow A of FIG. 8. In the second embodiment, the description of portions similar to those of the first embodiment is omitted and only different points will be described.

The second embodiment is an embodiment in which a press member 11' disposed on the upper side a film 7 to be fed has a columnar shape.

The press member 11' does not rotate even while the film 7 is being fed and is supported by a plurality of support members 29a in the same way as the above first embodiment.

As shown in FIG. 8 and FIG. 9, the press member 11' has a columnar shape and the upper half portion thereof is composed of a piezoelectric member 32 and the lower half portion thereof is composed of a metal member 33.

Slender band-shaped electrodes 35, 36 are adhered on the piezoelectric member 32 to impose a drive voltage and the piezoelectric member 32 is polarized in the direction of an arrow 34, i.e., the direction from the electrode 35 toward the electrode 36.

Lead wires 35a, 36a are drawn from ends of the electrodes 35, 36, respectively and the other ends of these lead wires 35a, 36a are electrically connected to a piezoelectric member drive circuit 26 arranged similar to the first embodiment.

A temperature sensor 25 similar to that of the first embodiment is adhered on the surface of the metal member 33 which is not abutted against the film 7 to be fed and an output of the temperature sensor 25 is input to a control circuit 27 similar to that of the first embodiment through a lead wire 25a.

Next, a principle for vibrating the press member 11' will be explained.

When a voltage is imposed on the piezoelectric member 32 in the direction by which the electrode 35 side is made positive and the electrode 36 side is made negative, the piezoelectric member 22 extends in the direction of polarization shown by an arrow 34.

Since the volume of the piezoelectric member 32 is not changed at the time, the longitudinal direction of the piezoelectric member 22, i.e., the direction of the piezoelectric member 32 in the direction perpendicular to the direction of the arrow 7a in which the film 7 is fed is contracted by the amount of extension of the piezoelectric member 32 in the polarized direction.

As a result, since the metal member 33 on which the piezoelectric member 32 is adhered is contracted on the upper end surface thereof, the press member 11' is bent as a whole with both ends thereof moved upward in FIG. 8.

On the other hand, when the direction of the voltage imposed on the piezoelectric member 32 is reversed, the piezoelectric member 32 is contracted in the polarized direction shown by the arrow 34 and extended in the longitudinal direction thereof. As a result, the press member 11' is bent with both ends thereof moved downward in FIG. 8 contrary to the above.

When an AC voltage is imposed between the electrode 35 and the electrode 36, the extension and contraction of the press member 11' as described above are repeated and bending vibration is generated to the press member 11'. When the frequency of the AC voltage to be imposed is set equal to a resonant frequency inherent to the press member 11', the press member 11' is resonated and the amplitude thereof is increased.

The arrangement and operation of the other portions of the second embodiment are substantially the same as those of the aforesaid first embodiment.

Note, although the press member 11' is disposed on the upper side and the feed roller 11' is disposed on the lower side in the above description, it is needless to say that the press member 11 may be disposed on the lower side and the feed roller 10 may be disposed on the upper side by reversing the above positional relationship.

The second embodiment as described above has substantially the same advantage as that of the aforesaid first embodiment.

Figure 10:
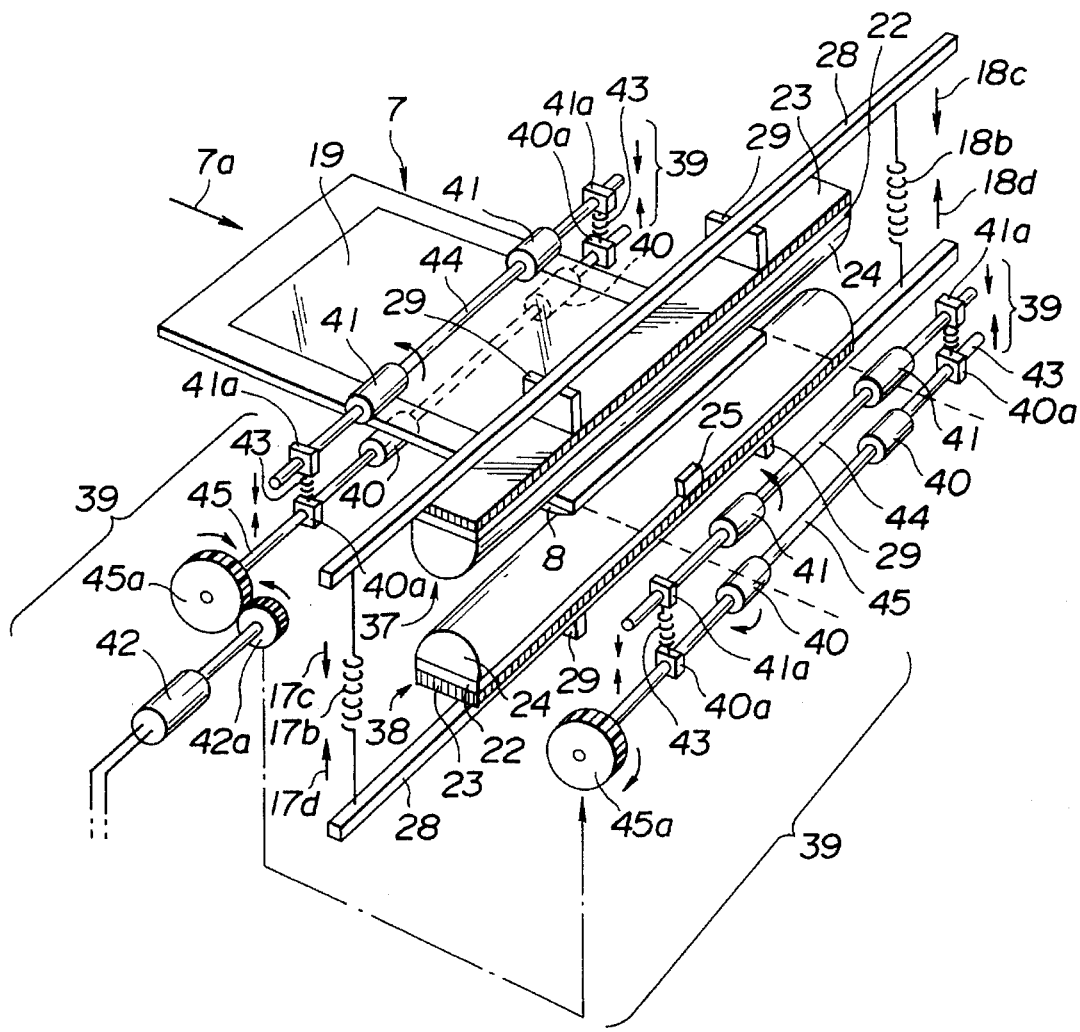
FIG. 10 is a perspective view showing a processing solution spread unit of a third embodiment of the present invention.

FIG. 10 showing a third embodiment of the present invention is a perspective view of a processing solution spread unit. In the third embodiment, the description of portions similar to those of the aforesaid first and second embodiments is omitted and only different points will be mainly described.

As shown in FIG. 10, two stationary press members 37, 28 are disposed in confrontation with each other above and below a film 7 to be fed and arranged similar to the press member 11 in the aforesaid first embodiment.

A temperature sensor 25 is adhered on the surface of the press member 38.

Note, lead wires for driving piezoelectric members provided with the press members 37, 38 and a lead wire for an output of a temperature sensor 25 are omitted in FIG. 10.

In the third embodiment, since neither the press member 37 above the film 7 nor the lower press member 38 below it rotates, the bearings 17a, 18a needed in the second embodiment are not needed at all.

Instead, the film 7 is fed by a film feed mechanism 39 as described below in the third embodiment.

Feed rollers 40 and follower rollers 41 are disposed on the rear edge side of the film 7 backwardly of the press members 37, 38 in confrontation with each other with the fed film 7 held therebetween. The feed rollers 40 are rotatably supported by a shaft 45 passing through bearings 40a and the follower rollers 41 are rotatably supported by a shaft 44 passing through bearings 41a, respectively.

Springs 43 are interposed between the bearings 40a, 41a to urge the rollers 40, 41 against the film 7 with a proper press force.

A gear 45a is integrally disposed to an end of the shaft 45 of the above rollers 40 and meshed with a pinion gear 42a fixed to the output shaft of a film feed motor 42.

With this arrangement, as the film 7 is fed by the feed rollers 40 which are rotated by the drive force of the film feed roller 42, the follower rollers 41 are also rotated.

On the other hand, feed rollers 40 and follower rollers 41 arranged in a manner substantially similar to the aforesaid ones are also disposed on the front edge side of the film forwardly of the press members 37, 38 and a gear 45a disposed at an end of the shaft 45 of the feed rollers 40 is meshed with the pinion gear 42a of the above film feed roller 42 through a gear train (not shown).

With this arrangement, the film 7 having passed between the press members 37, 38 is further fed toward the front edge side thereof.

In this embodiment, since the film feed mechanism 39 is provided independently of the press members 37, 38 which breaks the seal of a processing solution accommodating bag 8 and spreads a development processing solution over an exposing portion 19, a large force is not applied to the bearings 40a, 41a of the feed rollers 40 and the follower rollers 41. Thus, a load on the film feed motor 42 is reduced and a lesser amount of energy is lost in the bearings 40a, 41a.

Further, since the press members 37, 38 also serving as means for heating the development processing solution of the film 7 hold the film 7 from the upper and lower sides thereof, the film 7 is heated from the upper and lower sides thereof and heating efficiency is improved.

The arrangement and action of the other portions of the third embodiment are substantially similar to those of the aforesaid first embodiment.

The third embodiment has substantially the same advantage as those of the aforesaid first and second embodiments.

According to the first to third embodiments of the present invention as described above, the following arrangement, operation and advantage can be obtained.

Figure 11:
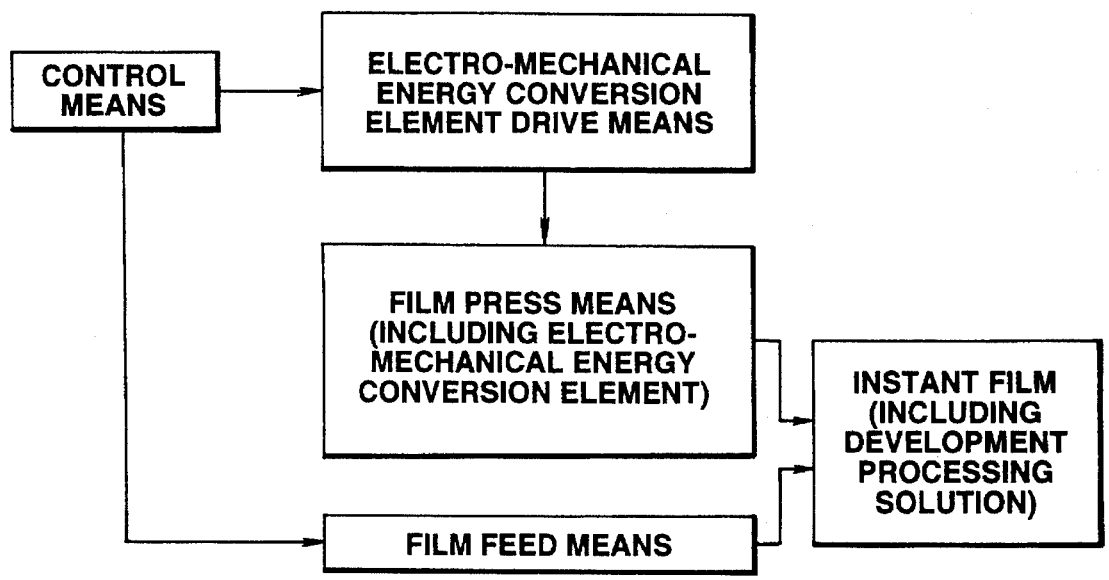
FIG. 11 is a block diagram showing an arrangement obtained from the first to third embodiments of the present invention.

As shown in FIG. 11, there is provided a camera including control means, film feed means for feeding an instant film containing a development processing solution under the control of the control means and a film press means having an electro-mechanical energy conversion element for pressing the above instant film by being driven by the control means through electro-mechanical energy conversion element drive means.

According to the arrangement shown in FIG. 11, since the press means presses a photographed film while being vibrated, a load on the film feed means can be reduced by greatly reducing the friction between the film press means and the film. Further, the development processing solution can be uniformly spread by the vibration of the film press means.

Figure 12:
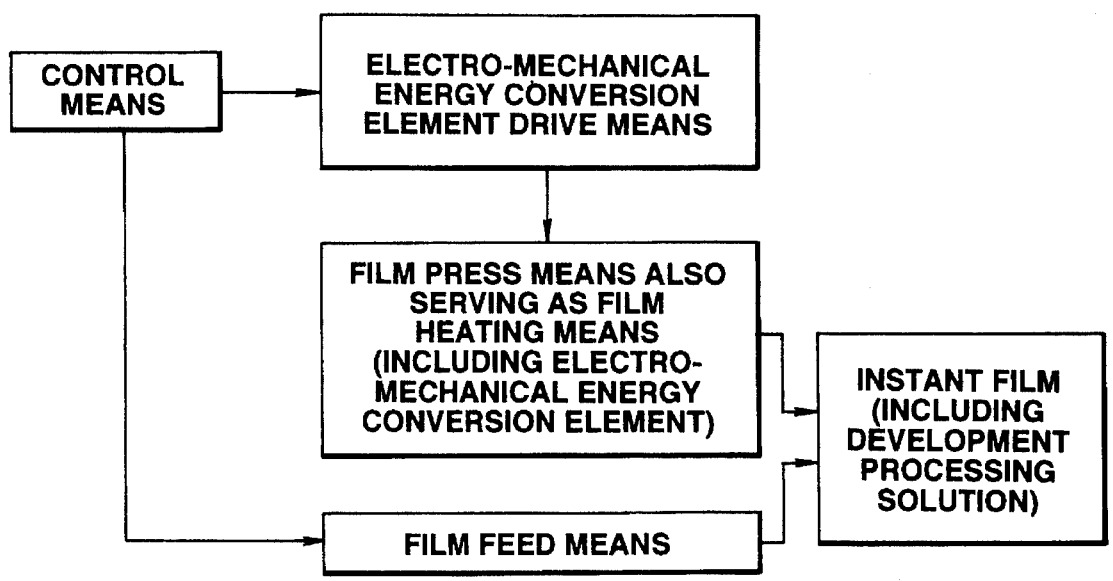
FIG. 12 is a block diagram showing an arrangement obtained from the first to third embodiments of the present invention.

As shown in FIG. 12, there is provided a camera including control means, film feed means for feeding an instant film containing a development processing solution under the control of the control means and a film press means also serving as film heating means having an electro-mechanical energy conversion element for pressing the above instant film by being driven by the control means through electro-mechanical energy conversion element drive means.

According to the arrangement shown in FIG. 12, there is obtained operation and advantage substantially similar to those of the arrangement shown in FIG. 11 as well as when a peripheral temperature is low, the film is temporarily stopped at a predetermined position while the film is being fed by the film press means vibrated by the electro-mechanical energy conversion element and the film feed means is capable of temporarily stopping the feed of the film and the development processing solution contained in the instant film is heated.

Figure 13:
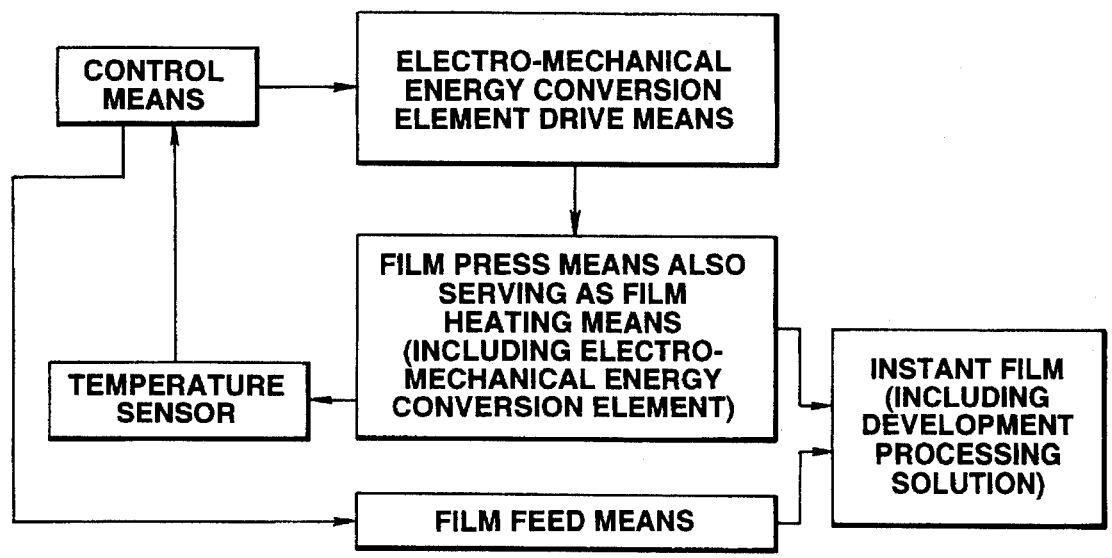
FIG. 13 is a block diagram showing an arrangement obtained from the first to third embodiments of the present invention.

As shown in FIG. 13, there is provided a camera including control means, film feed means for feeding an instant film containing a development processing solution under the control of the control means, a film press means also serving as film heating means having an electro-mechanical energy conversion element for pressing the above instant film by being driven by the control means through electro-mechanical energy conversion element drive means, and a temperature sensor for detecting the temperature of the film press means and transmitting the result of detection to the control means.

According to the arrangement shown in FIG. 13, there is obtained operation and advantage substantially similar to those of the arrangement shown in FIG. 12 as well as when a peripheral temperature is low, the temperature of the film press means is detected by the temperature sensor to heat the development processing solution to a proper temperature.

Figure 14:
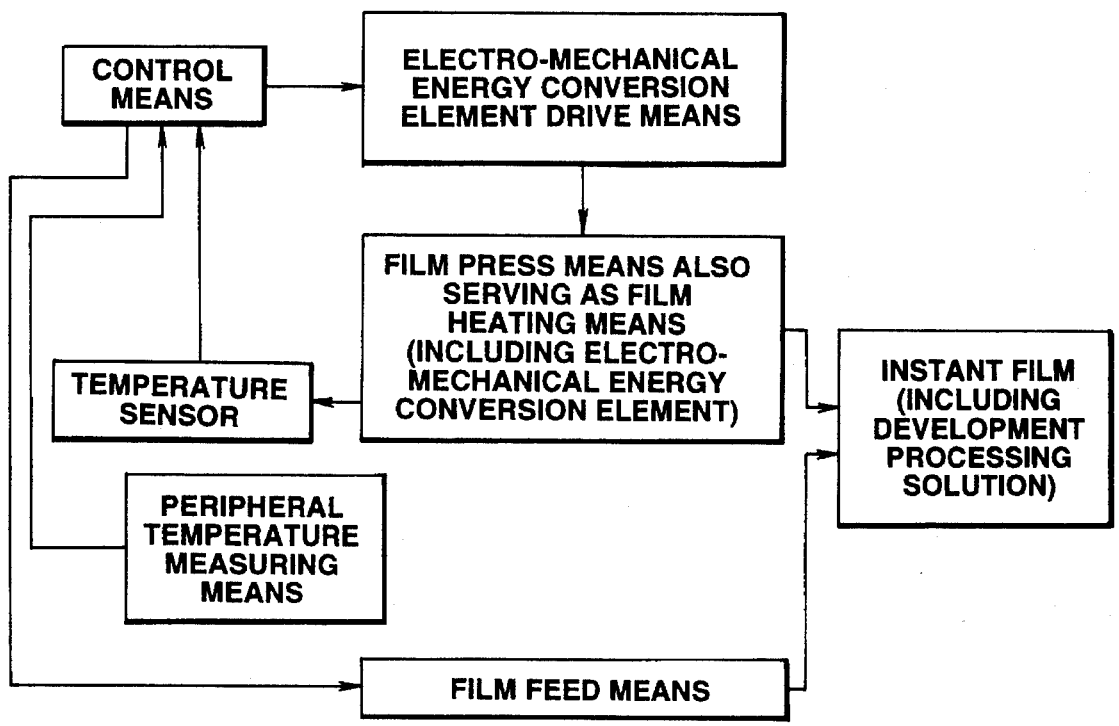
FIG. 14 is a block diagram showing an arrangement obtained from the first to third embodiments of the present invention.

As shown in FIG. 14, there is provided a camera including control means, film feed means for feeding an instant film containing a development processing solution under the control of the control means, a film press means also serving as film heating means having an electro-mechanical energy conversion element for pressing the above instant film by being driven by the control means through electro-mechanical energy conversion element drive means, a temperature sensor for detecting the temperature of the film press means and transmitting the result of detection to the control means, and peripheral temperature measuring means for detecting a peripheral temperature and transmitting the result of detection to the control means.

According to the arrangement shown in FIG. 14, there is obtained operation and advantage substantially similar to those of the arrangement shown in FIG. 13 as well as when a peripheral temperature is low, the control means properly controls heating operation in accordance with the result of detection of the peripheral temperature measuring means.

Figure 15:
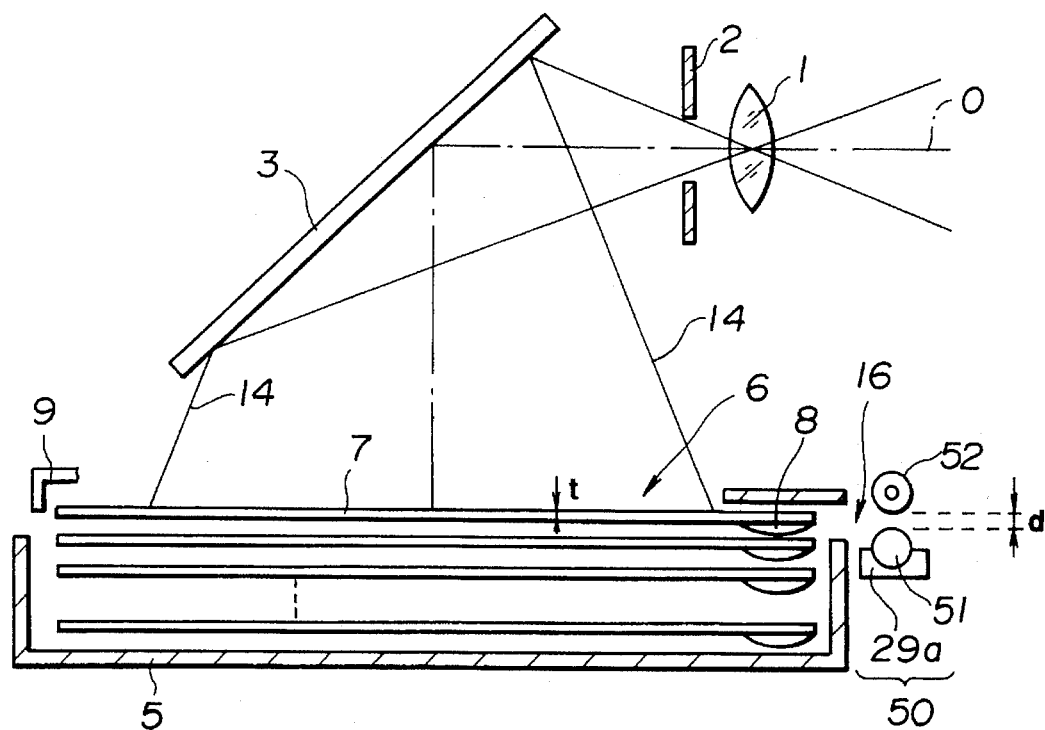
FIG. 15 is a side elevational view, partly in cross section, of an instant camera containing a processing solution spread unit when the image of a subject is exposed to a film in a fourth embodiment of the present invention.

Next, FIG. 15 to FIG. 25 show a fourth embodiment of the present invention, wherein FIG. 15 is a side elevational view showing an instant camera containing a processing solution spread unit when the image of a subject is exposed to a film. In the fourth embodiment, the description of portions similar to those of the aforesaid first to third embodiments is omitted and only different points will be mainly described.

The instant camera is arranged in a manner substantially similar to the one described in the aforesaid first embodiment and film feed and press means 50 as a portion of the processing solution spread unit is disposed in the vicinity of the discharge port 16 of the camera.

The film feed and press means 50 includes an ultrasonic motor 51 disposed on the lower side of a film 7 to be fed, support members 29a for supporting the ultrasonic motor 51 and a follower roller 52 located on the lower side of the film 7 to be fed.

The interval or gap d between the ultrasonic motor 51 and the follower roller 52 is set slightly smaller than the thickness t of the film 7.

Figure 16:
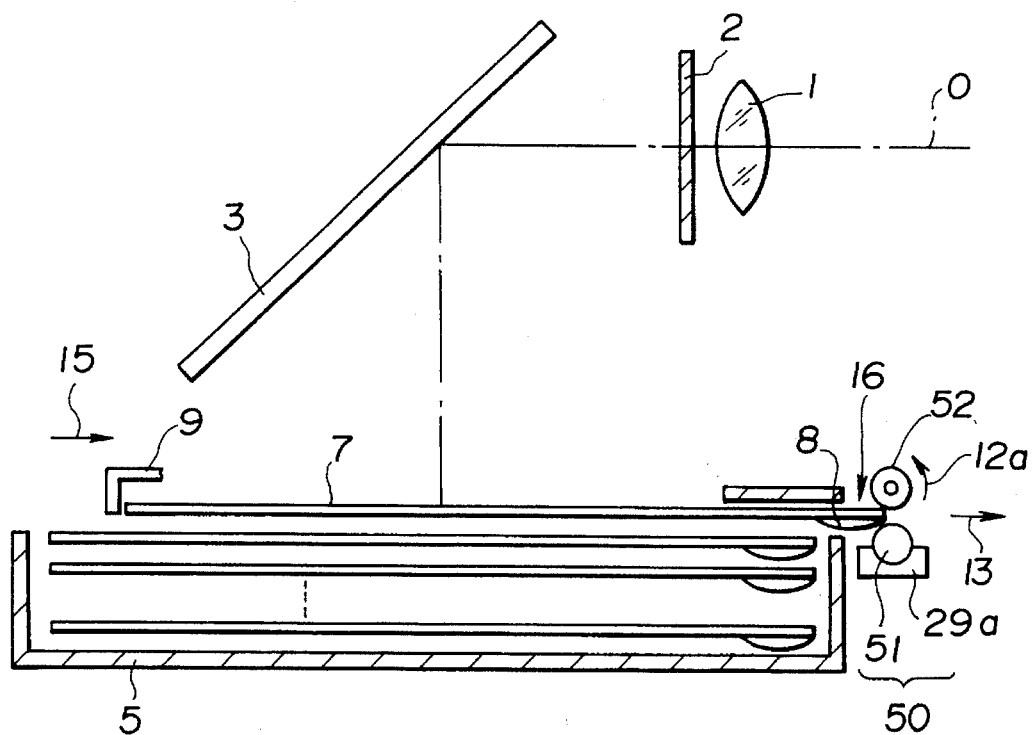
FIG. 16 is a side elevational view, partly in cross section, of the instant camera in a state where a photographed film having been exposed is raked out from a film pack in the fourth embodiment.

FIG. 16 is a view showing the state that exposure is finished by closing a shutter 2 and the photographed film 7 is being raked out from a film pack 5.

A raking-out member 9 moves in the direction of an arrow 15 and pushes the rear edge of the photographed film 7 positioned at the uppermost location of the films stacked in a film pack 5 toward the discharge port 16.

Thus, the front edge of the film 7 where a processing solution accommodating bag 8 is provided projects from the discharge port 16 of the film pack.

Then, the front edge of the film 7 is forced between the ultrasonic motor 51 of the film feed and press means 50 and the follower roller 52 thereof.

Since the ultrasonic motor 51 is driven at the time, when the front edge of the film 7 is forced between the ultrasonic motor 51 and the follower roller 52, the film 7 is fed in the direction of an arrow 13 by the propelling force of the ultrasonic motor 51 and the follower roller 52 is rotated in the direction of arrow 12a at this time.

Figures 17, 18:
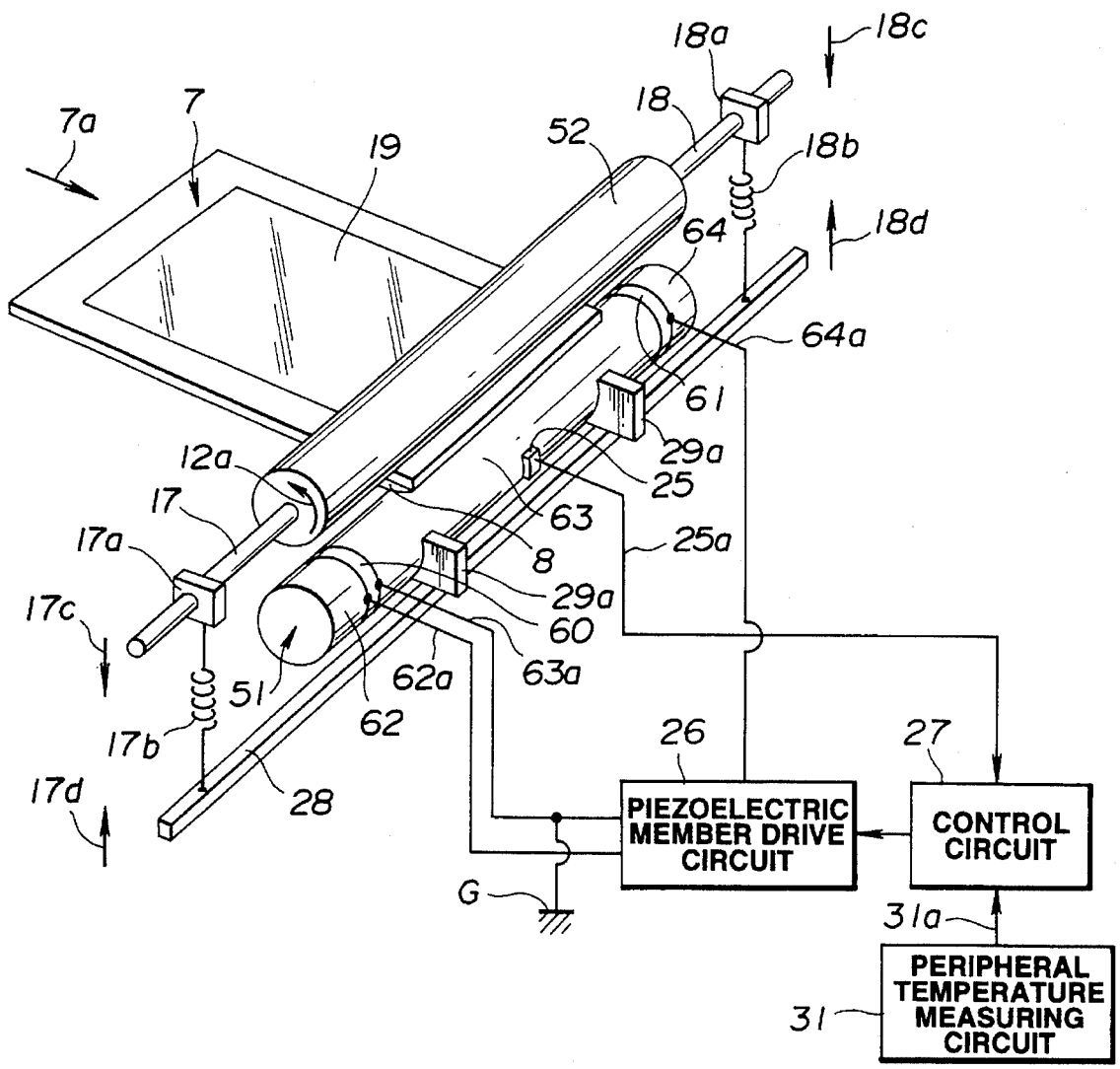
FIG. 17 is an enlarged perspective view showing the processing solution spread unit of the camera of the fourth embodiment.
FIG. 18 is a perspective view showing an ultrasonic motor of the fourth embodiment exploded in an axial direction.

FIG. 17 is an enlarged perspective view showing a processing solution spread unit of the camera.

As described above, the ultrasonic motor 51 is disposed on the lower side of the film 7 to be fed in the direction of an arrow 7a, the follower roller 52 is disposed on the upper side of the film 7, and the ultrasonic motor 51 and the follower roller 52 are disposed in such a manner that the directions of the central axes thereof are perpendicular to the direction of the arrow 7a.

The ultrasonic motor 51 is composed of piezoelectric members 60, 61 as short columnar electro-mechanical conversion elements coaxially held between metal columns 62, 63, 64 whose diameter is substantially the same as that of the piezoelectric members 60, 61 and constitutes a columnar ultrasonic vibrator as a whole.

The metal columns 62, 63, 64 also serve as electrodes for imposing drive voltages on the piezoelectric members 60, 61 and lead wires 62a, 63a, 64a are drawn therefrom, respectively.

These lead wires 62a, 63a, 64a are connected to the output terminals of a piezoelectric member drive circuit 26 so that two-phase AC drive voltages to be described below are imposed thereon.

The lead wire 63a is also connected to the ground potential G of an electric circuit contained in the camera, i.e., to the negative terminal of a not shown battery. With this arrangement, the metal column 63 in contact with the film 7 to be fed is connected to the ground potential G. This is for the purpose of grounding unnecessary electrostatic charge generated on the surface of the film 7 while the film is being fed to the ground potential G.

The piezoelectric member drive circuit 26 includes a phase switch circuit for switching the phase of the above two-phase drive voltages and operation for feeding the film 7 and operation for heating a development processing solution in the state that the film 7 is stopped are switched by switching the phase.

The above piezoelectric member drive circuit 26 is controlled by a control circuit 27 as the control means of the camera.

Further, a temperature sensor 25 is disposed on the surface of the metal column 63 and an output of the temperature sensor 25 is input to the aforesaid control circuit 27 through a lead wire 25a. With this arrangement, the surface temperature of the metal column 63 can be measured.

The ultrasonic motor 51 also serves as heating means as described below and does not rotate even when the film 7 is being fed. Therefore, the temperature sensor 25 can be directly fixed on the ultrasonic motor 51 and the lead wire 25a can be drawn from the sensor 25.

With this arrangement, the surface temperature of the ultrasonic motor 51 as the film heating means can be more accurately measured as compared with conventional means. As result, a temperature control can be more accurately carried out.

The camera is provided with a peripheral temperature measuring circuit 31 for measuring a peripheral temperature, i.e., an atmospheric temperature and an output 31a therefrom is also input to the above control circuit 27.

The above ultrasonic motor 51 is supported by a plurality of support members 29a arranged at the positions of the nodes of generated vibration as described below. Further, the plurality of support members 29a are supported by a slender support bar 28 disposed substantially in parallel with the ultrasonic motor 51.

As described above, since the ultrasonic motor of the processing solution spread unit of this embodiment does not need bearings for supporting rotation, the arrangement of the processing solution spread unit is simplified and no energy is lost in the bearings (since bearings are omitted) and thus the efficiency of the processing solution spread unit is improved as compared with a conventional processing solution spread unit.

As described above, the follower roller 52 is disposed on the upper side of the film 7 to be fed and rotated in the direction of the arrow 12a in accordance with the feed of the film. The follower roller 52 has shafts 17, 18 projecting from the ends of the roller 52 integrally therewith and these shafts 17, 18 are rotatably supported by bearings 17a, 18a, respectively.

A spring 17b is interposed between the bearing 17a and the support bar 28 and a spring 18b is interposed between the bearing 18a and the support bar 28, respectively and these springs 17b, 18b are used to keep a certain interval therebetween when no external force is applied between the bearings 17a, 18a and the support bar 28.

When an external force is applied to increase the interval between the ultrasonic motor 51 and the follower roller 52, a contraction force is generated in the direction opposite to the direction of the external force by the springs 17b, 18b.

More specifically, the spring 17b attracts the support shaft 28 in the direction of an arrow 17d as well as attracts the bearing 17a in the direction of an arrow 17c, whereas the spring 18b attracts the support bar 28 in the direction of an arrow 18d as well as attracts the bearing 18a in the direction of an arrow 18c.

As a result of the above action, when no external force is applied between the flower roller 52 and the ultrasonic motor 51, that is, when the film 7 is not yet held between the flower roller 52 and the ultrasonic motor 51, the interval or gap therebetween is kept to a given interval d shown in FIG. 15.

When an external force is applied between the follower roller 52 and the ultrasonic motor 51, that is, when the film 7 which thickness t is larger than the above interval d is held therebetween, a press force is applied to the film 7 between the follower roller 52 and the ultrasonic motor 51 by the contraction forces of the springs 17b, 18b.

FIG. 17 shows the state that the portion of the processing solution accommodating bag 8 along the front edge of the film 7 is held between the follower roller 52 and the ultrasonic motor 51 and a press force is applied thereto.

FIG. 18 is an exploded perspective view showing the ultrasonic motor 51 when it is extended in an axial direction.

The piezoelectric member 60 is divided into two regions 60a, 60b which are symmetrical with respect to a boundary surface 60c shown by a broken line, each of the regions 60a, 60b being polarized in the thickness direction thereof and the directions of the polarization being reversed relative to one another as shown by arrows 66, 67.

Likewise, the piezoelectric member 61 is also divided into two regions 61a, 61b which are symmetrical with respect to a boundary surface 61c shown by a broken line, each of the regions 61a, 61b being polarized in the thickness direction thereof and the directions of the polarization being reversed relative to one another as shown by arrows 68, 69.

The boundary surface 60c of the piezoelectric member 60 and the boundary surface 61c of the piezoelectric member 61 are located at the positions inclined 90° about the axis of the metal column 63 each other.

Figure 19:
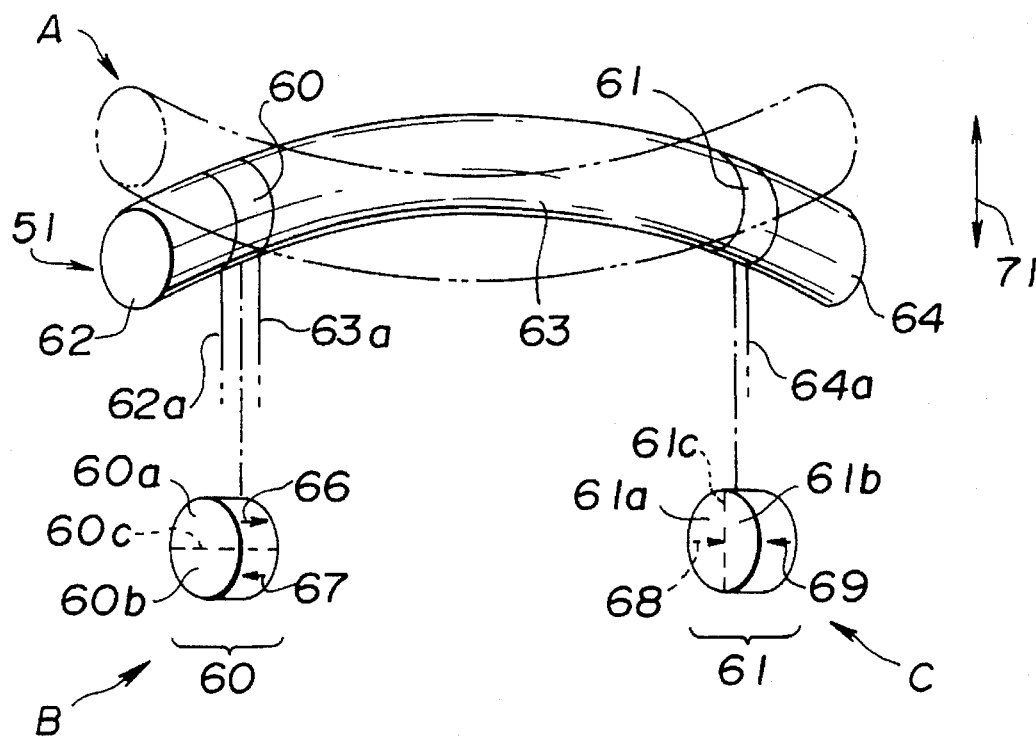
FIG. 19 is a perspective view showing vibration produced when an AC voltage is imposed on one of piezoelectric members of the ultrasonic motor of the fourth embodiment.
Figure 20:
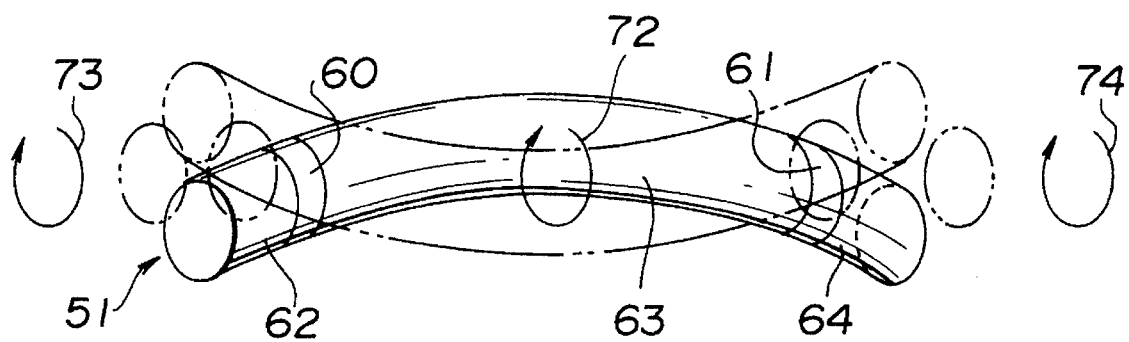
FIG. 20 is a perspective view showing eccentric rotational vibration of the ultrasonic motor of the fourth embodiment.

FIG. 19 and FIG. 20 are perspective views showing vibration generated to the ultrasonic motor 51.

It is supposed that the piezoelectric member 60 is horizontally polarized as shown in Symbol B in FIG. 19 in the ultrasonic motor 51 shown in Symbol A in FIG. 19.

When a voltage is imposed on the piezoelectric member 60 disposed as described above in such a direction as to set the lead wire 62a to a positive side and the lead wire 63a to a negative side, one of the regions 60a extends in a thickness direction and the other region 60b contracts in the same direction.

When the direction of the voltage imposed on the piezoelectric member 60 is reversed, the region 60a contracts and the region 60b extends this time.

When an AC voltage is imposed between the lead wire 62a and the lead wire 63a, the aforesaid extension and contraction are repeated so that vibration is generated to the periphery of the piezoelectric member 60.

When the frequency of the AC voltage is caused to coincide with the resonant frequency intrinsic to the ultrasonic motor 51, the ultrasonic motor 51 resonates as a whole to increase an amplitude so that bending vibration as shown in Symbol A in FIG. 19 is generated and the ends of the ultrasonic motor 51 are moved upward and downward as shown by an arrow 71.

The direction of the bending vibration shown by the arrow 71 is a direction perpendicular to the boundary surface 60c in the polarizing direction of the piezoelectric member 60.

Likewise, in the ultrasonic motor 51 shown Symbol A in FIG. 19, an AC voltage having the resonant frequency of the ultrasonic motor 51 is imposed on the piezoelectric member 61 polarized vertically as shown in Symbol C in FIG. 19.

That is, when the above AC voltage is imposed between the lead wire 64a and the lead wire 63a, bending vibration inclined 90° with resect to the arrow 71 shown in Symbol A in FIG. 19 is generated to the ultrasonic motor 51.

When bending vibrations in two directions as described above are synthesized by shifting the phases thereof 90°, vibration for enabling the amplitude of the bending vibration to rotate about the axis of the metal column 63 is generated as shown in FIG. 20, this vibration being similar to vibration generated when, for example, a man plays a hula hoop, that is, the vibration is such that both ends of the ultrasonic motor 51 make rotational motion as shown by arrows 73, 74 and the central portion of the ultrasonic motor 51 makes rotational motion whose phase is shifted 180° with respect to the rotational motion of the both ends as shown by an arrow 72. Hereinafter, the above vibration is described as eccentric rotational vibration.

The film 7 is fed in the direction of the arrow 7a of FIG. 17 by the antinode portion of the eccentric rotational vibration, i.e., by the vibration of the central portion of the ultrasonic motor 51 as shown by the arrow 72.

The ultrasonic motor 51 of the processing solution spread unit of this embodiment feeds the film 7 by the aforesaid principle and the feed speed of the motor 51 is suitably arranged to the processing solution spread unit.

Figure 21:
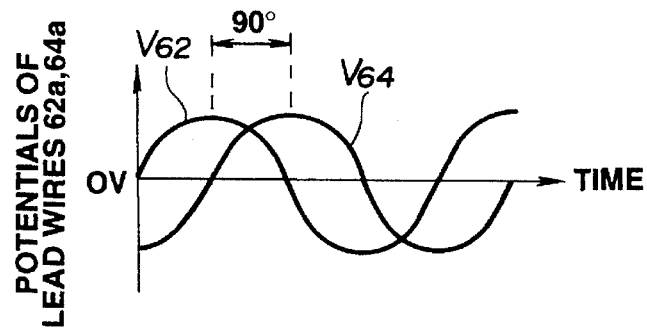
FIG. 21 is a graph showing voltages to be imposed on the ultrasonic motor when a film is fed in the fourth embodiment.

FIG. 21 is a graph showing the waveforms of AC voltages to be imposed between the lead wire 62a and the lead wire 63a and between the lead wire 64a and the lead wire 63a to generate the aforesaid eccentric rotational vibration to the ultrasonic motor 51.

As described above, the lead wire 63a is fixed to the ground potential or 0 volt. The voltage V62 of the lead wire 62a and the voltage V64 of the lead wire 64a are set as shown in FIG. 21 with respect to the potential of the lead wire 63a.

That is, the phase of the voltage V62 is shifted 90° from the phase of the voltage V64 and the frequency of the voltages is set to the resonant frequency inherent to the ultrasonic motor 51. With this arrangement, the bending vibrations in the two directions whose phases are shifted 90° as described above are generated to the ultrasonic motor 51.

Figure 22:
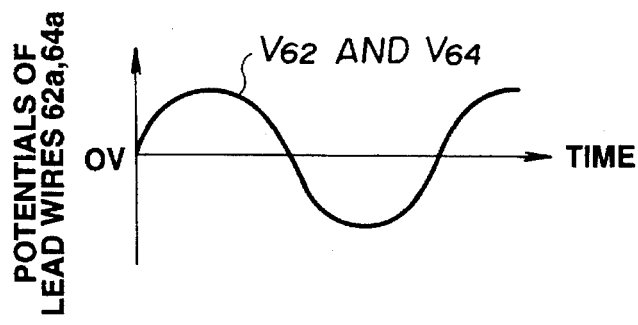
FIG. 22 is a graph showing voltages imposed on the ultrasonic motor when film is stopped in the fourth embodiment.

On the other hand, FIG. 22 is a graph showing the waveforms of AC voltages to be imposed between the lead wire 62a and the lead wire 63a and between the lead wire 64a and the lead wire 63a when the feed operation of the film 7 is stopped and the development processing solution of the film 7 is heated.

As shown in FIG. 22, the voltage V62 and the voltage V64 have the same phase in this case. At this time, the ultrasonic motor 51 only makes bending vibration in the direction inclined 45° with respect to the arrow 71 shown in Symbol A in FIG. 19 and does not generates eccentric rotational vibration as shown in FIG. 20.

Therefore, a force for feeding the film 7 is not generated and only heat is generated by vibration, so that the development processing solution accommodated in the processing solution accommodating bag 8 of the above film 7 is heated.

The phases of the two drive voltages as shown in FIG. 21 and FIG. 22 are switched by a phase switch circuit contained in the above piezoelectric member drive circuit 26.

Figure 23:
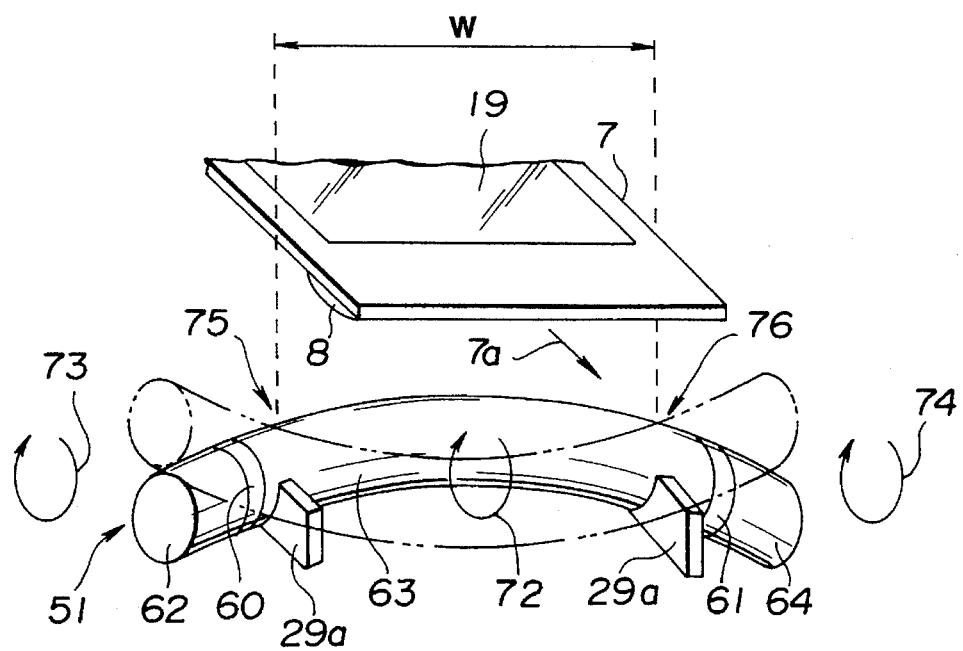
FIG. 23 is a perspective view showing the relationship between the positions of the nodes of eccentric rotational vibration of the ultrasonic motor and the width of a film in the fourth embodiment.

FIG. 23 is a perspective view showing the relationship between the eccentric rotational vibration generated to the ultrasonic motor 51 by the voltages as shown in FIG. 21 imposed thereon and the width W of the film 7.

As shown in FIG. 23, the size, shape and the like of the ultrasonic motor 51 are arranged so that the distance between the nodes 75, 76 of the vibration of the ultrasonic motor 51 coincides with the width W of the film 7. Then, the plurality of the support members 29a support the ultrasonic motor 51 at the positions of the nodes 75, 76 of the vibration.

Incidentally, although the direction shown by the arrow 7a in which the film 7 advances is intrinsically a direction perpendicular to the central axis of the ultrasonic motor 51, when the direction is curved by any factor, the uniform spread of the development processing solution is obstructed. However, when the film 7 is fed between the two nodes 75, 76 of the vibration of the ultrasonic motor 51, even if the direction in which the film 7 advances tends to be curved, the direction is returned to a straight direction by the vibration shown by the arrows 73, 74 generated on both end sides located outwardly of the nodes 75, 76 of vibration of the ultrasonic motor 51.

Therefore, even if no special guide member is provided, the film 7 can be fed straight in the direction of the arrow 7a which is the intrinsic advancing direction of the film 7.

Figure 24:
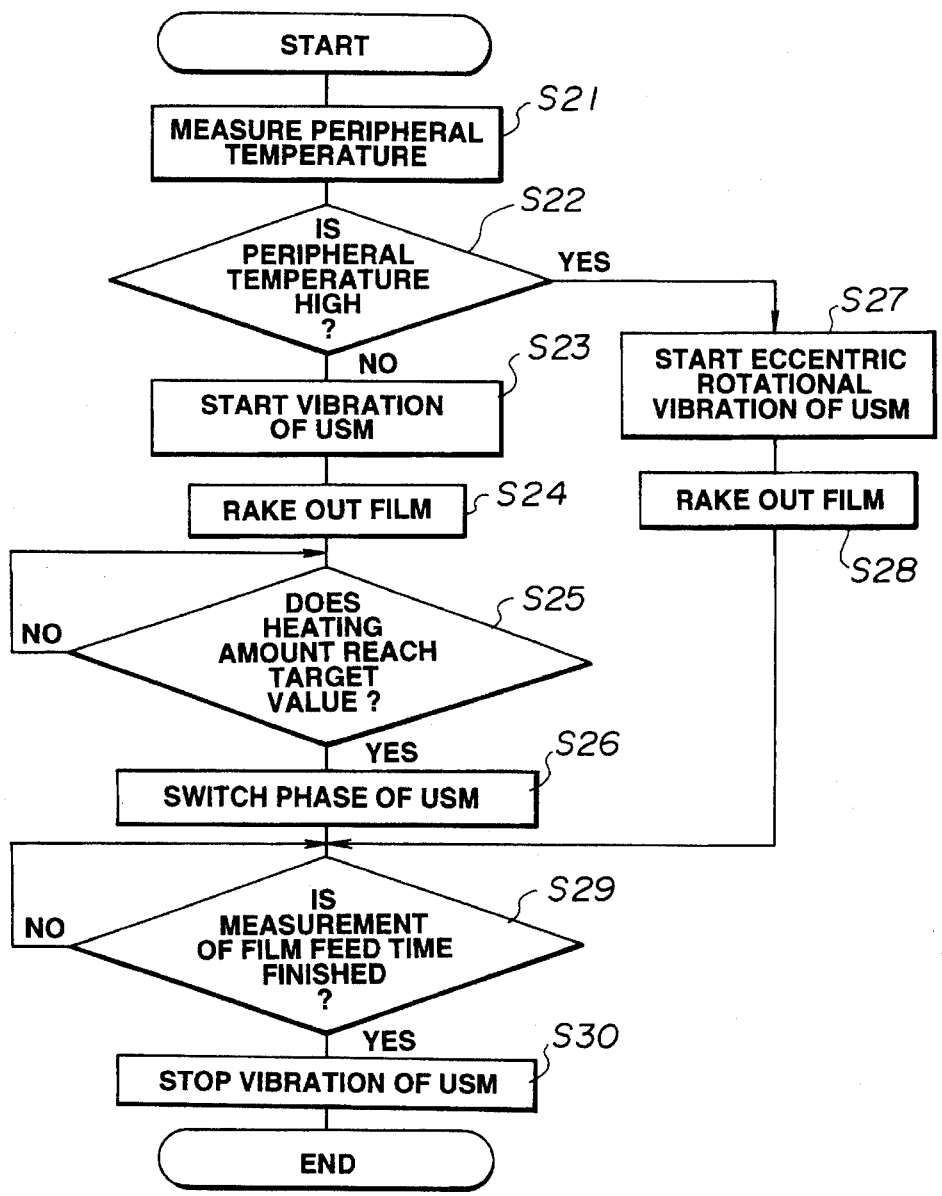
FIG. 24 is a flowchart showing the film feeding operation and processing solution spreading operation of the camera of the fourth embodiment.

FIG. 24 is a flowchart showing a film feed and processing solution spreading operation.

When a frame of image is photographed by the camera by closing the above shutter 2, the sequence of the flowchart starts.

First, the peripheral temperature of the camera is measured by the peripheral temperature measuring circuit 31 step S21), and the result of measurement is stored in the memory means of control circuit 27.

Next, it is determined whether or not the peripheral temperature measured at step S21 is a predetermined temperature suitable for the development of the film 7, that is, whether the peripheral temperature is, for example, at least 25° C. or not (step S22).

When the peripheral temperature is below 25° C. at step S22, a drive voltage starts to be imposed on the ultrasonic motor 51 (abbreviated as USM in FIG. 24) (step S23). The two-phase AC voltages imposed at the time have the same phase as shown in FIG. 22, that is, the ultrasonic motor 51 only makes bending vibration. Although the surface temperature of the ultrasonic motor 51 is increased by the bending vibration, even if the film 7 is held between the ultrasonic motor 51 and the follower roller 52, the film 7 is not fed.

Next, the photographed film 7 is raked out from the film pack 5 by the raking-out member 9 and the front edge of the film 7 is forced between the ultrasonic motor 51 and the follower roller 52 (step S24).

At the time, the film 7 is not fed by the ultrasonic motor 51 as described above and stops in the state that the front edge thereof is held between the ultrasonic motor 51 and the follower roller 7.

More specifically, the film 7 stops in the state that the processing solution accommodating bag 8 of the film 7 is in contact with the ultrasonic motor 51 also serving as the heating means and the development processing solution starts to be heated. At the time, however, the seal of the processing solution accommodating bag 8 is not yet broken.

Next, the development processing solution is heated while an amount of heat applied to the development processing solution is measured. That is, the surface temperature of the ultrasonic motor 51 is continuously measured by the temperature sensor 25 disposed on the ultrasonic motor 51 while a period of time of heating is measured which is a period of time elapsed since the ultrasonic motor 51 also serving as the heating means comes into contact with the processing solution accommodating bag 8 along the front edge of the film 7.

Although the development processing solution is heated through the processing solution accommodating bag 8, the material forming the processing solution accommodating bag 8 does not have a high heat transfer coefficient. Therefore, the surface temperature of the ultrasonic motor 51 as the heating means is not made equal to the temperature of the development processing solution.

Figure 25:
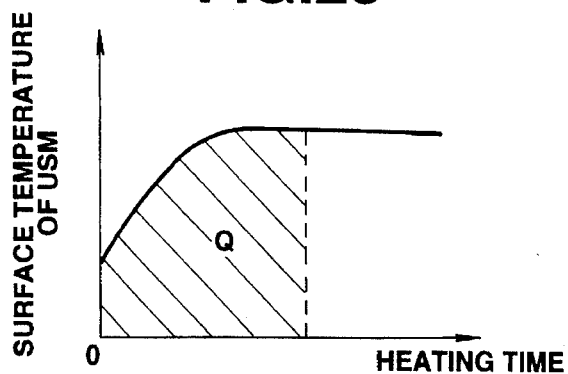
FIG. 25 is a graph showing the relationship between a heating time and the surface temperature of an ultrasonic motor in the fourth embodiment.

On the other hand, it is impossible to directly measure the temperature of the development processing solution. Thus, the relationship between the integrated value Q of the surface temperature of the ultrasonic motor 51 resulting from a heating time and the temperature of the development processing solution as shown in FIG. 25 is previously measured at the stage when a prototype of the camera is made or the like.

The integrated value Q is calculated by repeatedly detecting the surface temperature and the heating time of the ultrasonic motor 51 and the temperature of the development processing solution is calculated based on the integrated value Q.

Then, it is determined whether the temperature of the development processing solution reaches a target value determined in accordance with the peripheral temperature measured at step S21 or not (step S25).

The target value is determined taking the peripheral temperature and an amount of heat discharged in development which is determined by a period of time of development from the start of development to the end thereof. That is, an average temperature during the period of time of development is set to a proper development temperature by heating the development processing solution to a temperature somewhat higher than a proper development temperature.

When the temperature of the development processing solution reaches the target value at step S25, the waveform of the drive voltages imposed on the ultrasonic motor 51 is switched to a waveform having a phase shifted 90° as shown in FIG. 21 by the phase switch circuit contained in the above piezoelectric member drive circuit 26 (step S26).

Thus, the ultrasonic motor 51 starts to make eccentric rotational vibration to start the feed of the film 7, so that the heating of the development processing solution carried out in the state that film 7 stops is finished. At the same time, a press force is continuously applied from the front edge of the film 7 toward the exposing portion 19, so that the seal of the processing solution accommodating bag 8 is broken and the development processing solution accommodated in the processing solution accommodating bag 8 is spread over the exposing portion 19.

At the time, since the surface of the exposing portion 19 is covered with transparent plastics, even if the development processing solution is developed, it does not leak to the outside.

Although the surface of the ultrasonic motor 51 is kept hot by the vibration even while the film is fed thereafter, since the film 7 moves and a time at which a point on the film 7 in contact with the ultrasonic motor 51 is very short, the temperature of the development processing solution is not hardly increased while the film 7 is fed.

When a uniform press force is continuously applied toward the rear edge of the film 7 as described above, the development processing solution is uniformly spread over the entire surface of the developing portion 19 and development processing is uniformly carried out. The uniform spread of the development processing solution is important to the uniform development processing without irregularity.

On the other hand, when the peripheral temperature is higher than 25° at step S22, the development processing solution need not be heated and drive voltage waveforms having a phase shifted 90° as shown in FIG. 21 start to be imposed on the ultrasonic motor 51 to generate eccentric rotational vibration (step S27).

Next, the photographed film 7 is raked out from the film pack 5 by the raking-out member 9 and the front edge of the film 7 is forced between the ultrasonic motor 51 and the follower roller 52 (step S28).

After the front edge of the film 7 is held between the ultrasonic motor 51 and the follower roller 52, the film 7 is fed by the ultrasonic motor 51 having made the eccentric rotational vibration and at the same time the seal of the processing solution accommodating bag 8 is broken to spread the development processing solution over the exposing portion 19.

After the execution of step S26 or step S28, a period of time during which the film 7 is fed is measured until the period of time reaches a predetermined target period of time (step S29). The target period of time is preset by measuring the period of time from the time at which the front edge of the film 7 starts to be held between the ultrasonic motor 51 and the follower roller 52 to the time at which the rear edge of the film 7 has completely left the gap between motor 51 and roller 52.

At the time when the measurement of the period of time during which the film 7 is fed is finished, the photographed film 7 is discharged to the outside of the camera with the rear edge thereof completely displaced from between the ultrasonic motor 51 and the follower roller 52. At this time, the discharged film 7 is prevented from being dropped by the friction between a film discharge port provided with the covering member of the camera (not shown) and the rear edge of the discharged film 7.

Otherwise, although not shown, when a photographed film accommodating chamber is provided with the camera, the film 7 is fed into the chamber.

The film 7 is developed by the development processing solution and the image of a subject is formed on the exposing portion 19 after a certain period of time. Thereafter, the developing operation is automatically finished and the image of the subject is fixed on the exposing portion 19.

Upon completion of the above operation, the drive voltages imposed on the ultrasonic motor 51 are turned off (step S30) and the film feed and processing solution spread operation is finished.

Note, although the follower roller 52 is disposed on the upper side and the ultrasonic motor 51 is disposed on the lower side in the above description, it is needless to say that the follower roller 52 may be disposed on the lower side and the ultrasonic motor 51 may be disposed on the upper side by reversing the above positional relationship.

Further, the shape of the ultrasonic motor is not limited the columnar shape but any other shape is of course acceptable so long as it is suitable for the feed of the film 7.

According to the fourth embodiment, since a reduction gear needed by a conventional processing solution spread unit using an electromagnetic motor is not needed, the arrangement of the unit is simplified and the as noisy operation sound conventionally generated by the reduction gear is removed, a camera with quiet operation sound can be realized. Since no electromagnetic motor is used, no electromagnetic noise is generated. Further, since the ultrasonic motor makes fine vibration, even if the surface of the ultrasonic motor as the press means does not have a specifically high dimensional accuracy, the development processing solution can be uniformly spread.

Since the ultrasonic motor vibrated by the piezoelectric member generates heat, when the development processing solution is heated using the heat, dedicated heating means becomes unnecessary. Therefore, the development processing solution can be heated by a simple arrangement.

Since the ultrasonic motor also serving as the heating means does not rotate even while the film is being fed, the temperature sensor can be directly adhered on the surface of the ultrasonic motor. Therefore, a heating control can be more accurately carried out by accurately measuring the surface temperature of the heating means directly.

The provision of the peripheral temperature measuring circuit enables a heating control to be more properly carried out in accordance with the peripheral temperature of the camera.

Further, since the film can be fed straight without the need of a special guide member, the development processing solution can be spread by a simple arrangement.

Figure 26:
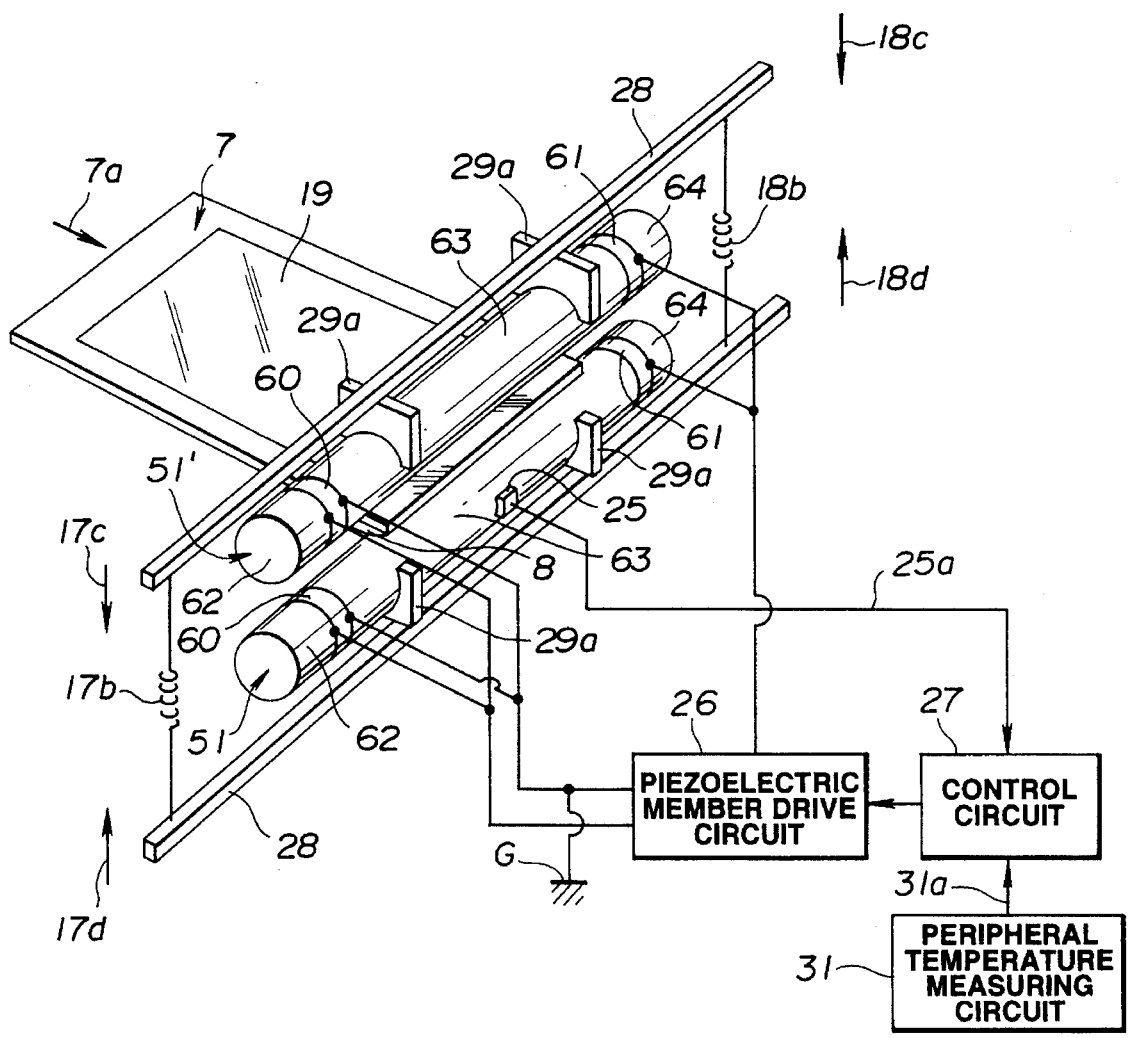
FIG. 26 is a perspective view showing a processing solution spread unit of a fifth embodiment of the present invention.
Figure 27:
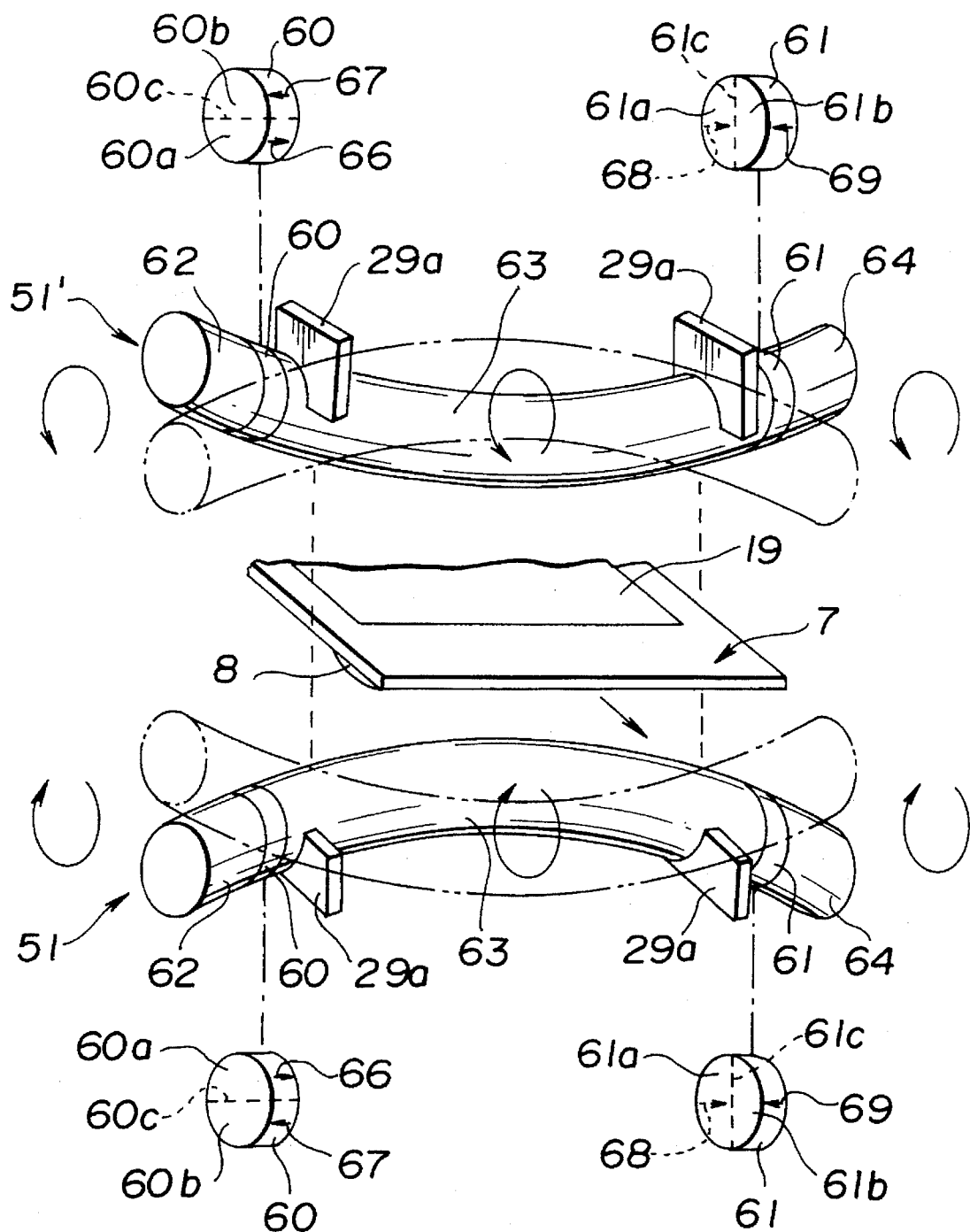
FIG. 27 is a perspective view showing eccentric rotational vibration generated in an ultrasonic motor of the fifth embodiment.

FIG. 26 and FIG. 27 show a fifth embodiment of the present invention, wherein FIG. 26 is a perspective view showing a processing solution spread unit of a camera. In the fifth embodiment, the description of portions similar to those of the aforesaid first to fourth embodiments is omitted and only different points will be mainly described.

In the fifth embodiment, two ultrasonic motors 51, 51' each arranged in a manner similar to the ultrasonic motor 51 of the above fourth embodiment are disposed above and below a film 7 in confrontation each other as press means.

With this arrangement, since no rotational member is used in the press means, no bearings are needed and the arrangement of the unit is simplified. Further, since no energy is lost in the bearings, the efficiency of the unit is further improved as compared with the fourth embodiment.

FIG. 27 is a perspective view showing the state of the eccentric rotational vibrations made by the two ultrasonic motors 51, 51' disposed above and below the film 7, the directions in which piezoelectric members 60, 61 are polarized and the directions of the boundary surfaces of polarization.

As shown in FIG. 27, since the ultrasonic motors 51, 51' are disposed at positions where they are symmetrical with respect to a mirror surface with the film 7 held therebetween, eccentric rotational vibrations generated at the time are also symmetrical with respect to the mirror surface.

The other arrangement and operation of the fifth embodiment is substantially the same as those of the above fourth embodiment.

The fifth embodiment has substantially the same advantage as that of the fourth embodiment except for an even greater reduction in energy loss. Further, both the upper and lower ultrasonic motors give a propelling force to the film, the film can be fed by a force about twice that of the fourth embodiment.

According to the aforesaid fourth and fifth embodiments, the following arrangement, operation and advantage can be obtained.

Figure 28:
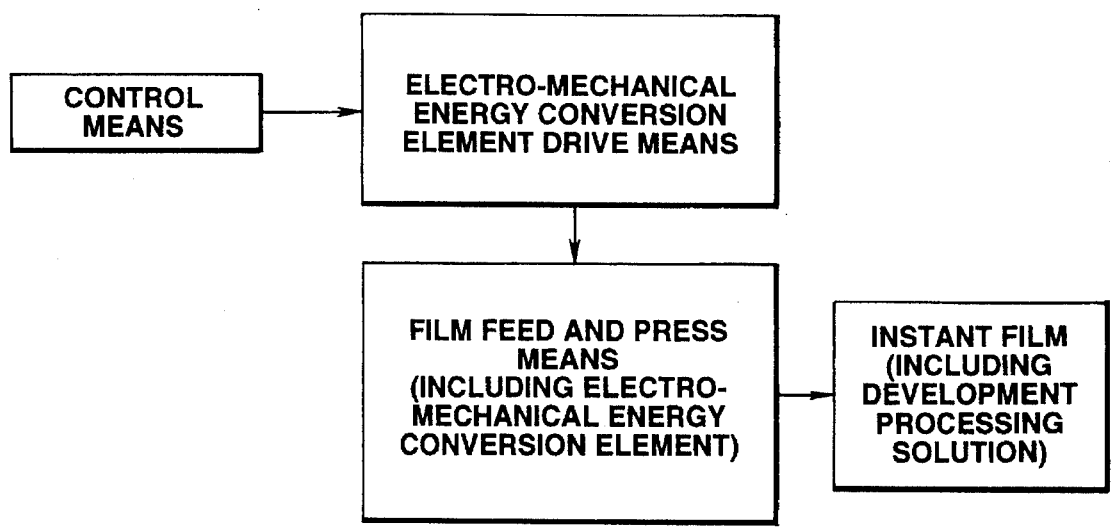
FIG. 28 is a block diagram showing an arrangement obtained by the forth and fifth embodiments of the present invention.

As shown in FIG. 28, there is provided a camera including control means and film press means also serving as film feed means having an electro-mechanical energy conversion element for feeding an instant film containing a development processing solution while pressing the film by being driven by the control means through electro-mechanical energy conversion element drive means.

According to the arrangement shown in FIG. 28, a photographed film can be fed while being pressed by the above film press means for feeding the film by eccentric rotational vibration with an arrangement more simple than a conventional one and more quiet operation sound. Further, a development processing solution can be uniformly spread by the vibration of the above film press means.

Further, according to the arrangement shown in FIG. 28, the film can be fed straight without the need of a special guide member by causing the distance between the nodes of the eccentric rotational vibration of the film feed and press means to coincide with the width the film.

Figure 29:
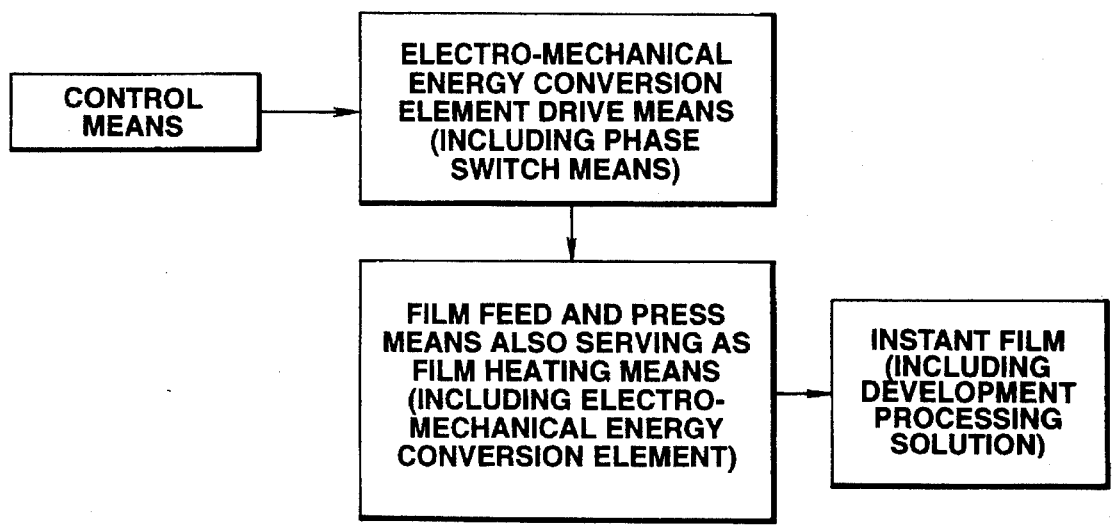
FIG. 29 is a block diagram showing an arrangement obtained from the fourth and fifth embodiments of the present invention.

As shown in FIG. 29, there is provided a camera including control means and film press means also serving as film feed means and film heating means having an electro-mechanical energy conversion element for feeding an instant film containing development processing solution while pressing the film by being driven by the control means through electro-mechanical energy conversion element drive means having phase switch means.

According to the arrangement of FIG. 29, there is obtained operation and advantage substantially similar to those of the arrangement shown in FIG. 28 as well as when a peripheral temperature is low, the film is temporarily stopped at a predetermined position while it is being fed by the above electro-mechanical energy conversion element drive means and the above film press means and the development processing solution contained in the above instant film is heated by the above film press means.

Figure 30:
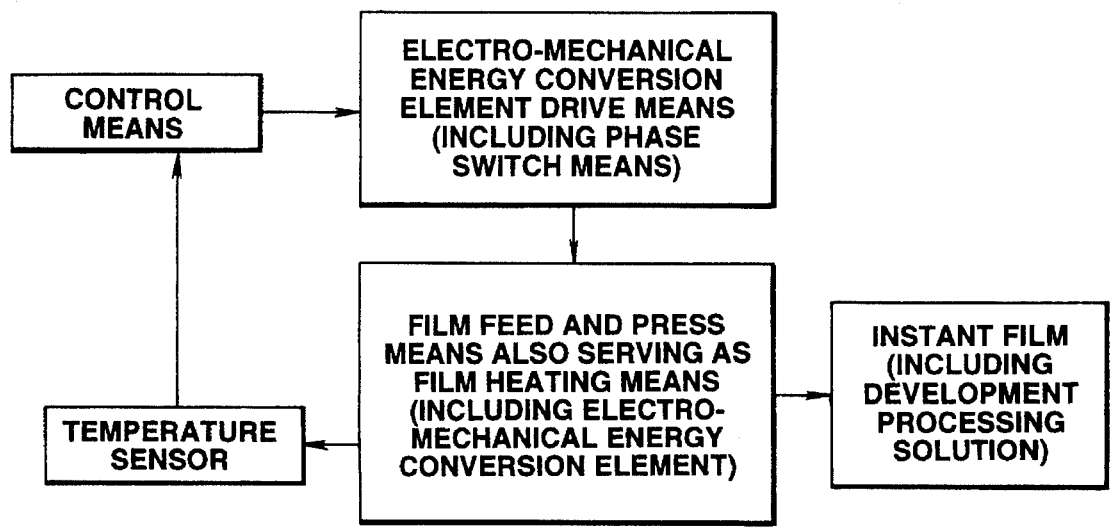
FIG. 30 is a block diagram showing an arrangement obtained from the fourth and fifth embodiments of the present invention.

As shown in FIG. 30, there is provided a camera including control means, film press means also serving as film feed means and film heating means having an electro-mechanical energy conversion element for feeding an instant film containing development processing solution while pressing the film by being driven by the control means through electro-mechanical energy conversion element drive means having phase switch means, and a temperature sensor for detecting the temperature of the film press means and transmitting the result of detection to the control means.

According to the arrangement of FIG. 30, there is obtained operation and advantage substantially similar to those of the arrangement shown in FIG. 29 as well as when a peripheral temperature is low, the temperature of the film press means is detected by the above temperature sensor and the development processing solution is heated to a proper temperature.

Figure 31:
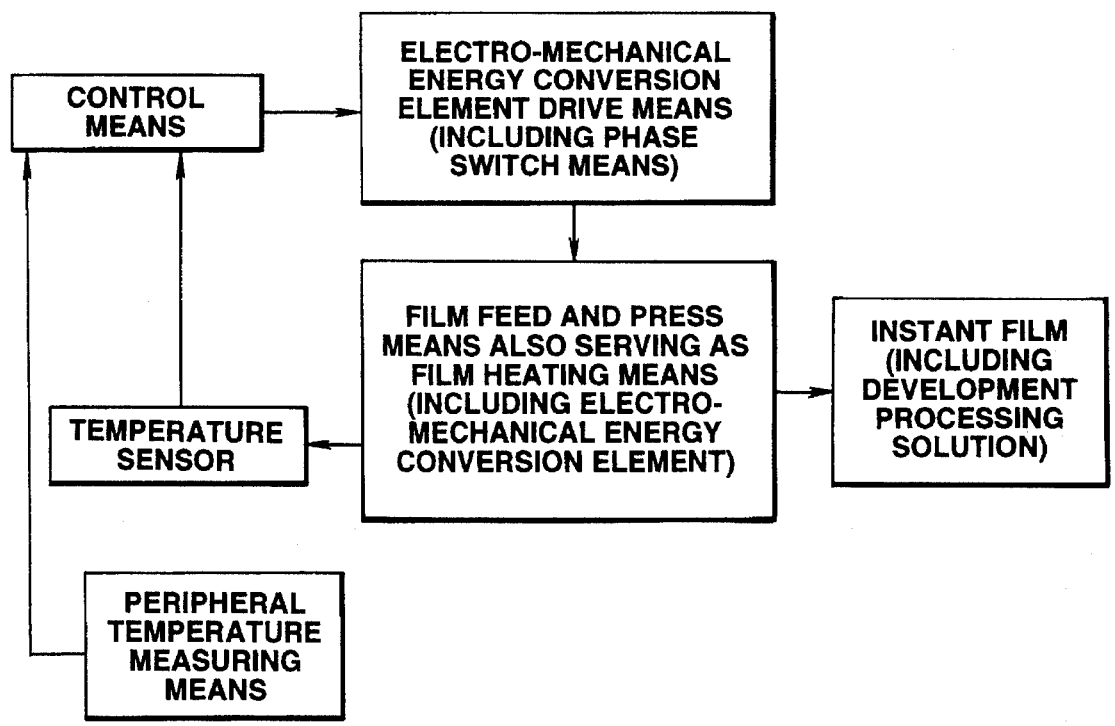
FIG. 31 is a block diagram showing an arrangement obtained from the fourth and fifth embodiments of the present invention.

As shown in FIG. 31, there is provided a camera including control means, film press means also serving as film feed means and film heating means having an electro-mechanical energy conversion element for feeding an instant film containing development processing solution while pressing the film by being driven by the control means through electro-mechanical energy conversion element drive means having phase switch means, a temperature sensor for detecting the temperature of the film press mean and transmitting the result of detection to the control means and peripheral temperature measuring means for detecting a peripheral temperature and transmitting the result of detection to the control means.

According to the arrangement of FIG. 31, there is obtained operation and advantage substantially similar to those of the arrangement shown in FIG. 30 as well as when a peripheral temperature is low, the control means carries out a proper heat control in accordance with the peripheral temperature based on the result detected by the above peripheral temperature measuring means.

In this invention, it is apparent that working modes different in a wide range can be formed on the basis of this invention without departing from the spirit and scope of the invention. This invention is not restricted by any specific embodiment except as may be limited by the appended claims.

What is claimed is:

1. A camera using films each including a development processing solution, comprising:

film feed means for feeding an exposed film to an outside of said camera or into an accommodating chamber;

press means for pressing said exposed film and spreading the development processing solution included in said film over the entire image region of said film; and an electro-mechanical energy converter comprising a piezoelectric element and provided with said press means to reduce a friction force to a pressed surface of said film by vibration of said press means.

2. A camera according to claim 1, wherein said press means also serves as means for heating the development processing solution.

3. A camera according to claim 2, wherein when the development processing solution is heated by said press means, a feed operation of said film being carried out by said film feed means is stopped.

4. A camera according to claim 2, wherein said press means is provided with a temperature sensor to detect a temperature of said press means.

5. A camera according to claim 2, wherein peripheral temperature detecting means is provided to detect a peripheral temperature of said camera.

6. A camera according to claim 2, wherein said press means generates heat by being vibrated by said electro-mechanical energy converter.

7. A camera according to claim 1, wherein said press means transmits heat generated by internal vibration imparted to the development processing solution.

8. A camera according to claim 1, wherein said press means causes the development processing solution to generate heat by transmitting vibration to the development processing solution.

9. A camera according to claim 1 further comprising:
   temperature measurement means for measuring ambient temperature external to said camera; and
   control means responsive to said temperature measurment means for initially operating said electro-mechanical energy converter prior to operation of said film feed means when an external temperature is less than a given value, and thereafter operating said film feed means to feed said exposed film to heat the development processing solution to a temperature level sufficient to assure adequate development of the image.

10. A camera according to claim 1 wherein said press means is mounted to prevent rotation thereof.

11. A camera according to claim 1 further comprising:
    first means for measuring ambient temperature external to said camera;
    second means for measuring temperature of said development processing solution; and
    control means responsive to said first and second means for initially energizing said electro-mechanical energy converter prior to operation of said film means for elevating a temperature of the development processing solution due to vibration of said press means imparted to said solution when said first temperature measuring means indicates that ambient temperature is below a given level, and initiating operation of said film means for feeding said exposed film when said second temperature measuring means indicates that said development processing solution has reached a given temperature.

12. A camera according to claim 1 wherein said press means comprises first and second pressing members arranged to engage opposing sides of said exposed film, each of said pressing members being provided with an electro-mechanical energy converter.

13. A camera using films each including a development processing solution, comprising:
    film feed means for feeding an exposed film to an outside of said camera or into an accommodating chamber; and
    press means for pressing said exposed film and spreading the development processing solution included in said exposed film over an entire image region of said film, wherein;
    a vibrator vibrated by an electro-mechanical energy converter comprising a piezoelectric element and which also serves as a driving means for said film feed means and said press means.

14. A camera according to claim 13, wherein said vibrator also serves as means for generating heat sufficient for heating the development processing solution.

15. A camera according to claim 14, wherein when the development processing solution is heated by said vibrator, a feed operation of said film is stopped.

16. A camera according to claim 14, wherein said vibrator is provided with a temperature sensor for detecting a temperature of said vibrator.

17. A camera according to claim 14, wherein peripheral temperature detecting means is provided to detect a peripheral temperature of said camera.

18. A camera according to claim 14, wherein said vibrator generates heat by being vibrated by said electro-mechanical energy converter.

19. A camera according to claim 13, wherein said vibrator generates bending vibration, said vibration being in a direction perpendicular to a direction in which said film is fed.

20. A camera according to claim 19, wherein said vibrator feeds said film by causing generated bending vibration to rotate about a given axis.

21. A camera according to claim 19, wherein a distance between nodes in bending vibration generated to said vibrator coincides with a size of said film in a direction perpendicular to the direction in which said film is fed.

22. A camera according to claim 19, wherein said vibrator heats the development processing solution by bending vibration generated by said vibrator.

23. Apparatus for accommodating a plurality of films each including a development processing solution, comprising:
    film feed means for feeding one of said films out of said apparatus when said film is exposed;
    press means for pressing said exposed film and spreading the development processing solution included in said film over an entire image region of said film; and
    an electro-mechanical energy converter comprising a piezoelectric element and provided with said press means to reduce a friction force to a pressed surface of said film by vibrating said press means.

24. Apparatus for accommodating a plurality of films each containing a development processing solution, comprising:
    film feed means for feeding an exposed one of said films to an exterior of said apparatus or into an accommodating chamber; and
    press means for pressing said exposed film and spreading the development processing solution included in said film over an entire image region of said film, wherein;
    a vibrator vibrated by an electro-mechanical energy converter comprising a piezoelectric element and which imparts vibration to said film feed means and said press means.

25. A camera using films each including a development processing solution, pressing a photographed film and feeding the film to an outside of the camera or into an accommodating chamber while spreading the development processing solution included in the film over an entire image region of the film with a film feed means composed of an electro-mechanical energy converter comprising a piezoelectric element, further comprising:
    drive means for driving said electro-mechanical energy converter so as to feed said film; and
    control means for controlling said drive means.

26. A camera according to claim 25, wherein said electro-mechanical energy converter is fixed to a bar-shaped vibrator.

27. A camera according to claim 25, wherein said electro-mechanical energy converter has a bar-shape.

28. A camera using films each including a development processing solution, comprising:

a vibrator vibrated by an electro-mechanical energy converter comprising a piezoelectric element;

press means for pressing said exposed film and spreading the development processing solution included in said exposed film over an entire image region of said film;

means for operating said piezoelectric element in a first mode to vibrate said press means while said exposed film remains stationary; and second control means for operating said piezoelectric element in a second operating mode for vibrating said press means and for causing said press means to move the exposed film to an outside of said camera or into an accommodating chamber.

29. A method for operating a camera using films each including a development processing solution sealed in a chamber at a forward end of each film, said camera having a movable rake member engageable with a rear edge of a film, a press means for pressing an exposed film and spreading the development processing solution initially sealed in said bag over an entire image region of the film, and a vibrator including a piezoelectric element for vibrating said press means, said method comprising the steps of:

(a) determining an ambient temperature exterior to said camera;

(b) moving said rake means to move said chamber against said press means;

(c) energizing said piezoelectric element responsive to a determined ambient temperature to vibrate said press means for an interval of time sufficient to elevate a temperature of said solution to a level sufficient to assure satisfactory development of an image; and (d) feeding said exposed film outside of said camera or into an accommodating chamber after said time interval.

30. A method for operating a camera using films each including a development processing solution sealed in a chamber at a forward end of each film, said camera having a movable rake member engageable with a rear edge of a film, a press means for pressing an exposed film and spreading the development processing solution initially sealed in said bag over an entire image region of the film, and a vibrator for vibrating said press means, said method comprising the steps of:

(a) determining an ambient temperature exterior to said camera;

(b) moving said rake means to move said chamber against said press means;

(c) energizing said vibrator responsive to a determined ambient temperature to vibrate said press means at a high frequency for an interval sufficient to elevate a temperature of said solution to a level to assure satisfactory development of an image; and (d) feeding said exposed film outside of said camera or into an accommodating chamber after said time interval.

* * * * *